United States Patent [19]
Nakamura et al.

[11] Patent Number: 5,490,133
[45] Date of Patent: Feb. 6, 1996

[54] OPTICAL INFORMATION PROCESSING APPARATUS AND METHOD OF CONTROLLING POSITION OF OPTICAL SPOT AND REPRODUCING SIGNALS

[75] Inventors: Shigeru Nakamura, Tachikawa; Mariko Umeda, Tokyo; Takeshi Nakao, Sgamihara; Akira Arimoto, Kodaira, all of Japan

[73] Assignee: Hitachi, Ltd., Tokyo, Japan

[21] Appl. No.: 772,443

[22] Filed: Oct. 7, 1991

[30] Foreign Application Priority Data

Oct. 5, 1990 [JP] Japan ................................ 2-266205
Oct. 24, 1990 [JP] Japan ................................ 2-284246

[51] Int. Cl.$^6$ ................................................. G11B 7/00
[52] U.S. Cl. ..................... 369/44.230; 369/44.280; 369/44.120; 369/112.000; 369/44.410
[58] Field of Search ................ 369/44.37, 44.27, 369/44.11, 44.28, 44.13, 44.29, 54, 44.12, 44.41, 44.42, 109, 110, 112, 44.38, 44.23, 44.24; 250/201.1

[56] References Cited

U.S. PATENT DOCUMENTS

| | | | |
|---|---|---|---|
| 4,788,678 | 11/1988 | Yoshizawa | 369/110 |
| 4,829,506 | 5/1989 | Bressers et al. | 369/112 |
| 4,924,079 | 5/1990 | Opheij et al. | 369/44.11 |
| 4,935,913 | 6/1990 | Shinoda | 369/44.11 |
| 5,095,472 | 3/1992 | Uchino et al. | 369/44.37 |
| 5,122,903 | 6/1992 | Aoyama et al. | 369/109 |
| 5,132,948 | 7/1992 | Ishibashi | 369/44.44 |
| 5,144,131 | 9/1992 | Opheij et al. | 369/44.23 |

FOREIGN PATENT DOCUMENTS 1-303632  12/1989  Japan .

OTHER PUBLICATIONS

Webster's Ninth New Collegiate Dictionary by Merrian Webster 1986 p. 111.

Primary Examiner—Nabil Z. Hindi
Attorney, Agent, or Firm—Antonelli, Terry, Stout & Kraus

[57] ABSTRACT

An optical information processing apparatus comprising a diffraction grating for producing a zero-order beam which is a beam emitted by a light source and allowed to pass therethrough and two plus and minus first-order sub-beams respectively having positive and negative astigmatisms, radiated in directions at slight angles different from the main beam, wherein said two sub-beams are focused at opposite positions across said main beam, wherein focusing control is performed by a focusing error signal detected from a difference of signal amplitudes obtained from the respective reflected light quantities of said two sub-beams and wherein tracking control is performed by an off-track signal obtained from a signal according to a reflected light quantity of said main beam. In an apparatus for magneto-optically reproducing information, above all else, a wave plate is inserted between the focusing lens and the separating optical system, thereby increasing the reflected light quantities and stabilizing the magneto-optical signal, focusing signal and tracking signal.

31 Claims, 19 Drawing Sheets

F I G. 1
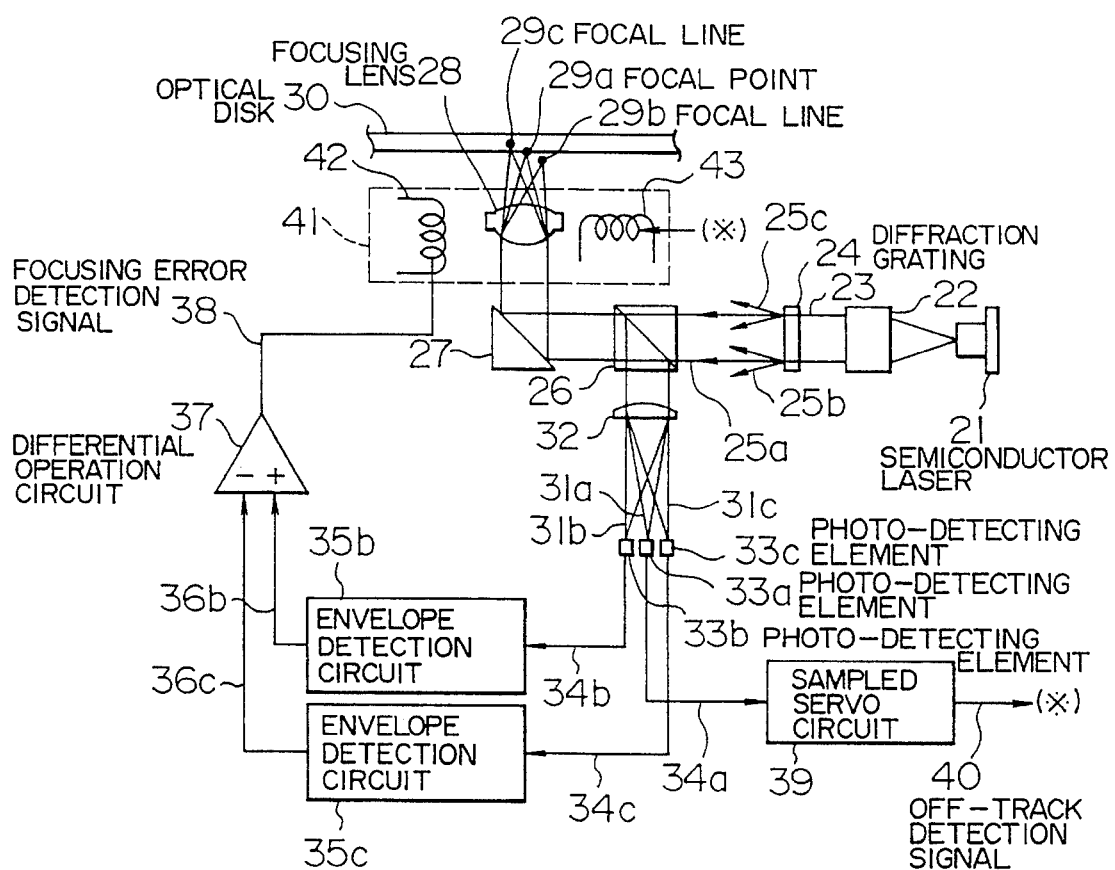

FIG. 4
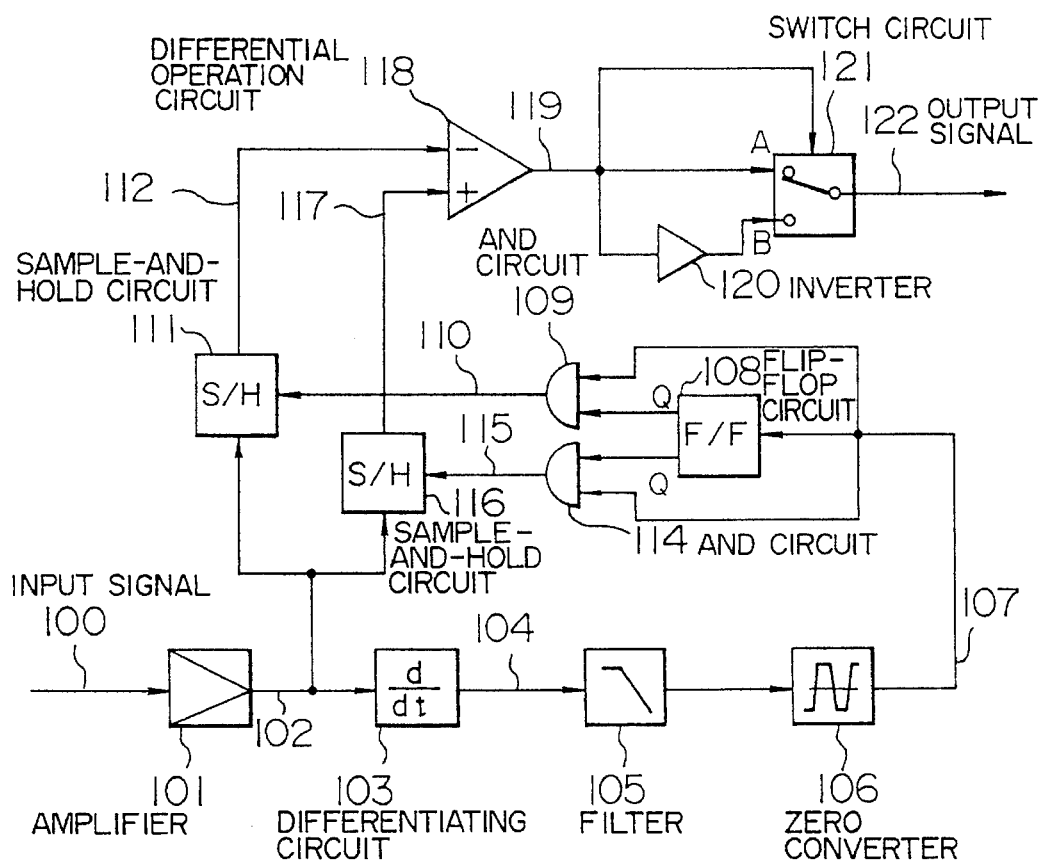
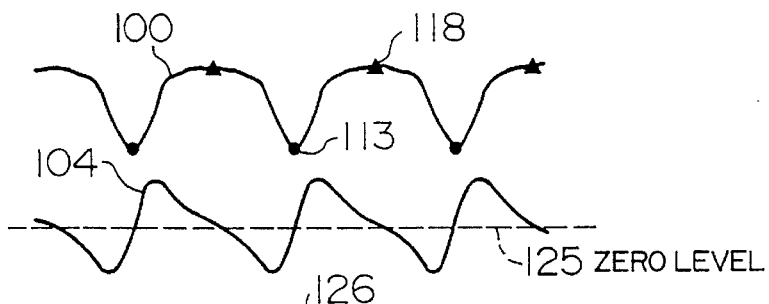
FIG. 5A
FIG. 5B
FIG. 5C
FIG. 5D
FIG. 5E

F I G. 6A
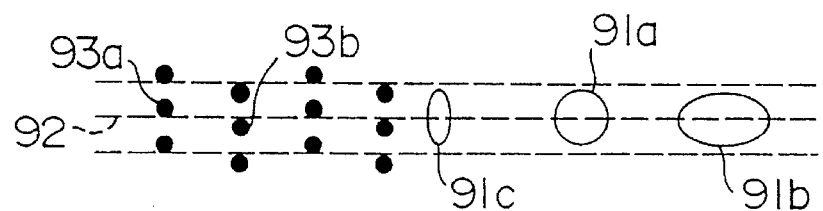
F I G. 6B
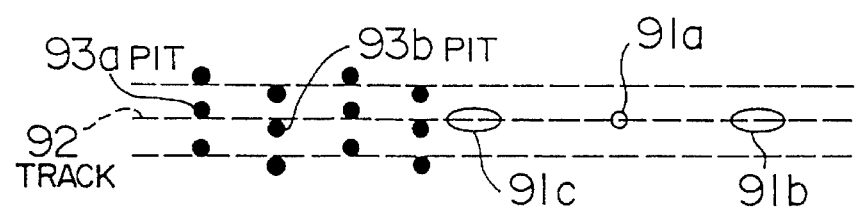
F I G. 6C
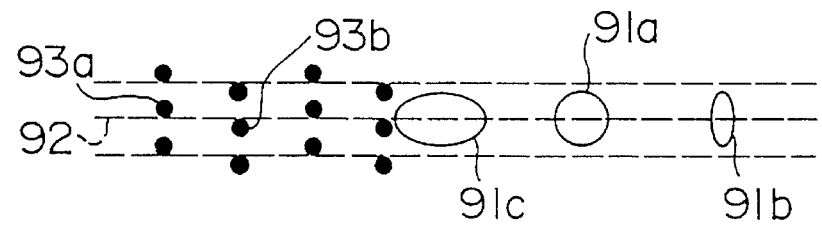

F I G. 14A
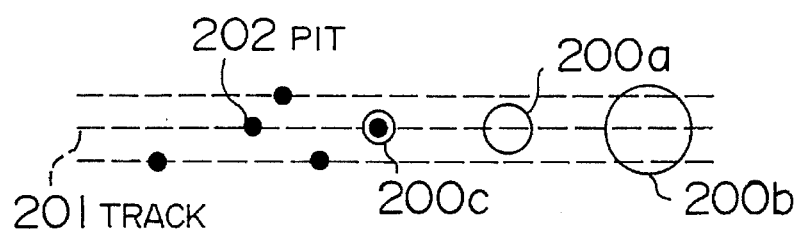
F I G. 14B
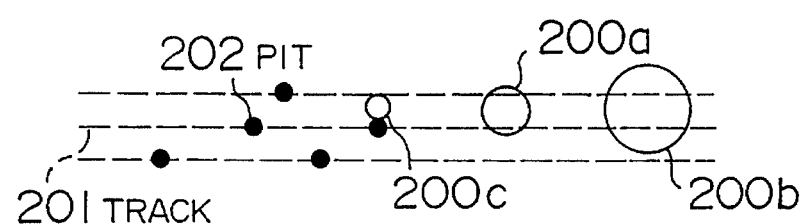
F I G. 14C
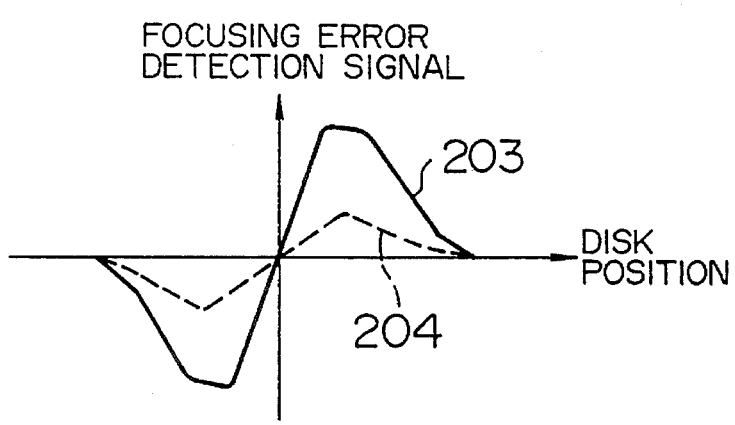

$\varepsilon_1 = b_1 / a_1$
$\varepsilon_2 = b_2 / a_2$

OPTICAL INFORMATION PROCESSING APPARATUS AND METHOD OF CONTROLLING POSITION OF OPTICAL SPOT AND REPRODUCING SIGNALS

BACKGROUND OF THE INVENTION

1. Field of the Invention

This invention relates to a method for detecting a focusing error and an optical head using this method, and more particularly to a method of detecting a focusing error which can easily adjust the position of an optical component and an optical head suitable for use in optical information processing apparatus such as an optical disk device, an optical card device, or an optical tape device.

2. Description of the Prior Art

Most of conventional focusing error detecting methods adopted for the optical heads of the optical disk devices or the like utilize the fact that the shape or the light intensity distribution of the reflected light from the disk varies according to a focusing error of the light. In this case, the reflected ray from the disk is received by a multi-division phot-detector, and an unbalance in the DC-like output signals is used as a focusing error detection signal.

For example, an astigmatic method is disclosed in JP-B-54-41883 (first prior art). If the reflected beam from the disk is given astigmatism by being passed through an astigmatic element such as a cylindrical lens, the reflected beam from the disk is focused in two focal lines perpendicular to each other, and the beam profile is circular of a position of the minimum confusion circle roughly midway between the two focal lines. This is the reason way a four-division photo-detector is placed at this minimum confusion circle position to receive the reflected beam from the disk. The shape of the reflected beam formed on the detection surface of the four-division photo-detector is substantially circular when the disk is located at the focal point. If the disk is displaced from the focal point, the shape of the reflected beam becomes two lines perpendicular to each other according to the direction in which the disk is displaced from the focal point. Thus, DC-like output signals from the phot-detector elements of diagonal position of the four-division photo-detector are added separately. A difference between two DC-like addition signals is taken as a focusing error detection signal.

On the other hand, besides the above-mentioned method of detecting an unbalance of DC-like output signals obtained by receiving changes in the shape or light intensity distribution of the reflected light from the disk by a multi-division photo-detector, another method is proposed in JP-A-1-303632 (second prior art) for detecting a focusing error by using a diffraction grating which forms light spots at different positions in the direction of the focus depth.

According to embodiment disclosed in JP-A-1-303632, the diffraction grating used constituted a part of a group of multiple concentric circular grating grooves, the interval of which increase or decrease gradually, and gives aberrations of positive and negative longitudinal shifts of an image point (aberration of focus) to the plus and minus first-order beams. This diffraction grating emits the plus and minus first-order beams in the opposite directions across the principal light axis of the main beam by using a region where the concentric circular grooves are decentered from the principal light axis of the main beam. Therefore, the plus and minus first-order beam are converged by an objective lens as two side spots at different positions in the direction of the focus depth either respect to the main beam. The quantities of reflected rays from the two side spots are modulated by signals recorded on the optical disk, and the degrees of modulation are detected by photo-detecting elements and an envelope detection circuit. The degrees of modulation by the two side spots change with the forcusing error at the optical disk, so that a difference is found between the two degrees of modulation to provide a focusing error detection signal.

SUMMARY OF THE INVENTION

In the first prior art in which a focusing target point must be set in the focusing error detection optical system, it is necessary to provide a measuring system separate from the focusing system in order to detect a disk position where a data signal or the like is maximum or a disk position where the reflected light quantity is maximum. The positions of the four division photo-detector and the detecting lens must be adjusted so that at the above-mentioned disk position, each photo-detecting element of the four-division photo-detector receives an equal amount of the reflected light from the disk and outputs DC signal at the same level, thereby reducing the focusing error detection signal to zero level. A resulting problem is that it takes time to assemble and adjust an optical head and, therefore, the optical head thus produced has to be expensive. Moreover, another problem is that the optical head must be provided with a high-precision mechanism for adjusting the position of the optical component, which makes it difficult to obtain a small-sized optical head.

When the optical components are displaced by a temperature change from the position when they are originally mounted, the position of the reflection light on the detection surface of the four-division photo-detector is displaced. As a result, an unbalance occurs among the DC-like outputs from the respective photo-detecting elements of the four-division photo-detector, so that the disk position where the focusing error detection signal is at zero level does not coincide with the target point position for focusing, with the result that offset is produced in the focusing error detection signal, which is a problem.

In the waveguide optical head considered as a possible type of the optical head in the future, the beam which propagates in the waveguide has a one-dimensional distribution. Therefore, yet another problem with this future type of optical head in that only a very few conventional focusing error detection methods using changes in he beam shape can be adopted in the waveguide optical heads. A still further problem is that in the waveguide optical heads, a lens element or a photo-detecting element is formed integrally on the waveguide substrate by using a crystal growth process and therefore, the photo-detecting element or lens element cannot be shifted for adjusting the focal point.

On the other hand, in the second prior art described above, the problems mentioned with regard to the first prior art have been solved. However, sufficient study has not been made of the arrangement of the pits to stably obtain a focusing error detection signal, nor the construction of the diffraction grating to determine the shapes of the side spots. Consequently, there is a problem that the pull-in motion for focusing control is unstable because of decrease in the degree of modulation resulting from a shift in the relative position between the side spots and pits provided in the radial direction of the optical disk. Normally, the automatic focusing control in the optical disk device should precede automatic tracking control, and therefore, the automatic focusing control must not be affected by the above-mentioned shift in the radial direction of the optical disk.

This will be described with reference to FIGS. 14A to 14C. In FIGS. 14A and 14B, reference numeral 200a denotes a main spot on the optical disk surface, 200b and 200c denote sub-spots on the optical disk surface, 201 denotes tracks, and 202 denotes pits recorded on the tracks 201. Both in FIGS. 14A and 14B, the position of the optical disk in the direction of the focus depth has bee shifted, in which condition the sub-spot 200c is smallest. FIG. 14A shows a case in which three spots move correctly along the center of the track 201 and therefore, the reflected light of the sub-spot 200c is modulated greatly. Though this is not illustrated, when the optical disk is shifted in the opposite direction and the sub-spot 200b is smallest, the reflected light from the sub-spot 200b is modulated greatly. Therefore, when the three spots move correctly along the center of the track 201, the focusing error detection signal occurs in a curve as indicated by the solid line 203. On the other hand, FIG. 14B shows a case in which the three spots move shifted from the center of the track 201 and therefore, the reflected light from the sub-spot 200c is not modulated so much at the pit 202 but the modulation is less than a half of the modulation in FIG. 14A. Though not shown, also when the optical disk is shifted in the opposite direction and the sub-spot 200b is smallest, the degree of modulation of the reflected light of the sub-spot 200b by the pit 202 is less than that in FIG. 14A. Therefore, when the three spots move shifted from the center of the track 201 as in FIG. 14B, as indicated by the broken line 204 of FIG. 14C, the focusing error detection signal at its peak decreases to less than a half that of the case of correct travel on the track, so that the detection sensitivity near the focal point decreases to less than a half. If the detection sensitivity decreases during the pull-in motion in automatic focusing control, the driver power will become insufficient for making the objective lens follow the shift of the disk and thereby the motion of the objective lens slows down, leaving a possibility for the pull-in motion to fail. Therefore a problem with the second prior art is that the pull-in motion for focusing control is unstable.

On the other hand, in automatic tracking control, there is the sampled servo system using pre-wobbled pits as a method by which the optical component is automatically set at a target point for tracking and which theoretically prevents offset from occurring even when the optical component is shifted. The off-track detection method used in this sampled servo system utilizes the phenomenon that when the main spot passes at least a pair of pre-wobbled pits arranged shifted by equal amounts to left and right with respect to the track center, a difference occurs in the modulation levels of the reflected beams from the left and right pre-wobbled pits according to the off-track amount of the main spot. The reflected beam is received by the photo-detector and the difference in the modulation level is detected to obtain an off-track detection signal. In this method, when the main spot moves along the track center, the off-track detection signal automatically goes to zero level, so that it is not necessary to adjust the positions of the optical components to set the target to follow the track. Further, the photo-detector has only to receive the total light quantity of the reflected beam, and even when the positions of the optical components change, offset does not occur in the off-track detection signal. However, in order to reduce the size and cost of the optical head, a single optical system is normally used both for focusing error detection and off-track detection, and a photo-detecting element for focusing error detection and both a photo-detecting element for off-track detection are mounted in the same photo-detector package. Therefore, in assembling an optical head, even though it is not necessary to adjust the positions of the optical components to set the target point for tracking, but it is still necessary to adjust with high accuracy the positions of the optical components for focusing. Therefore, the advantages of the sampled servo system cannot be utilized to the fullest extent.

A first object of the present invention is to provide an optical information processing apparatus which does not require adjustment of the positions of the optical components for focusing and which apparatus does not allow offset to occur in the focusing error detection signal even when the optical components are shifted from the originally mounted positions, and which apparatus is capable of self-adjustment of the target for focusing and also provide a method for detecting a focusing error, fairly applicable to a future type of the waveguide optical head.

A second object of the present invention is to provide a method of detecting a focusing error, which method enables the achievement of a stable pull-in motion for automatic focusing control without being affected by a shift in the radial direction of the optical disk and also provide an optical head using this method.

A third object of the present invention is to provide an optical head which can adjust the positions of the optical components by using tracking control by the sampled servo system in combination with an optical recording medium formatted for the sampled servo system.

A fourth object of the present invention is to provide, among magneto-optical disk devices, a magneto-optical disk device having a stable servo system, which disk device is made possible by reducing the light quantity fed back to the laser, improving a reproduced signal quality by an increased magneto-optical signal component, and increasing the light quantity guided into the focusing error detecting system.

According to the present invention, the optical information processing apparatus comprising a light source such as a semiconductor laser, a diffraction element such as a diffraction grating or a holographic element for forming a zero-order beam which is a beam emerging from the light source and allowed to pass therethrough as the main beam without changing its direction and also for forming two, plus and minus, first-order sub-beams respectively having positive and negative astigmatisms, emitted in the directions at very small angles different from the main beam, an image-forming optical system such as a focusing lens, an information medium such as an optical disk having recorded thereon makes such as pits in depressed form or pits of different reflectiveties, two photo-detectors or two photo-detecting elements of a split-type photo-detector for receiving the plus and minus first-order beams reflected by the information medium, two amplitude detecting means such as envelope detection circuits for detecting amplitude components modulated by the marks from the output signals of the respective photo-detecting elements, and a differential circuit for performing a subtraction between two amplitude detection signals output by the two amplitude detecting means.

In a second embodiment, the diffraction grating or a holographic element is a set of multiple straight grating grooves, the interval of which grooves increases or decreases gradually, and by giving positive and negative astigmatisms for converging or diverging in one direction to the plus and minus first-order beams, the plus and minus first-order beams are emitted in the opposite directions across the principal light axis of the zero-order beam.

In a third embodiment, the diffraction grating or the homographic element is a part of a set of multiple concentric elliptic grating grooves, the interval of which increases or decreases gradually, and the plus and minus first-order beams are given positive and negative astigmatisms for converging and diverging in two directions. The diffraction grating or holographic element is arranged at a position where the center of the concentric grooves is decentered from the principal light axis of the zero-order beam, the plus and minus first-order beams are emitted in the opposite directions across the principal light axis of the zero-order beam.

In a fourth embodiment, the amplitude detection circuit comprises a first sampled servo circuit for holding the output signal level of the photo-detecting elements when the positive or minus first-order beam is between the marks, a second sampled servo circuit for holding the output signal level of the photo-detecting elements when the positive or minus first-order beam is on the mark, and a differential operation circuit for performing a subtraction between the output signals of the first sampled servo circuit and the second sampled servo circuit.

In a fifth embodiment, the amplitude detection circuit includes a switch circuit for setting the polarity of the output signal of the amplitude detection circuit constantly at a positive or negative level.

In a sixth embodiment, the information medium has a first group of pits arranged a fixed distance separated on one side with respect to the center line of a specified track along which the main spot is guided, and a second group of pits arranged the same distance separated on the opposite side with respect to the track center line. The optical head has a third photo-detecting element for receiving the main beam reflected from the information medium, and obtains an off-track detection signal by comparing the output signal level of the third photo-detecting element when the main spot passes the first pit with the output signal level of the third photo-detecting element when the main spot passes the second pit.

In a seventh embodiment, by inserting a wave plate in the optical path from the light source to the focusing lens, an elliptically-polarized beam is produced, and emitted onto the recording medium.

The reflected light is divided into two portions, which are detected by differential detection, by which both the polarized axis rotation (Kerr effect) and the change in the ellipticity (optical dichroism) of the elliptically-polarized beam are detected, thereby increasing the amount of the magneto-optical signal.

In addition, the phase difference and the optical axis setting angle of the wave plate are set at specified values determined by the Kerr rotation angle and the Kerr ellipticity of the magneto-optical recording medium, thereby maximizing the amount of the magneto-optical signal. Or, the amount of the magneto-optical signal is made equal to or greater than the conventional signal amount obtained by detecting only the Kerr effect, thereby reducing the light quantity fed back to the laser light source to less than a half.

The principle of the focusing error detection method according to the present invention will be described with reference to FIG. 10. FIG. 10 shows a basic arrangement of an optical head utilizing the present invention. A laser luminous flux 2 emitted from the semiconductor laser 1 is separated by a diffraction grating 3 into a zero-order beam 4a, a plus first-order beam 4b, and a minus first-order beam 4c. The plus first-order beam 4b and the minus first-order beam 4c are emitted in the directions at very small angles different from the zero-order beam 4a. And the diffraction grating 3 used in the present invention is not ordinary equally-spaced straight groove type diffraction grating, but an unequally-spaced straight groove type diffraction grating or a concentric elliptic groove type diffraction grating, and functions as a positive cylindrical lens or toroidal lens with respect to the plus first-order beam and as a negative cylindrical lens or toroidal lens with respect to the minus first-order beam. Thus, the plus first-order beam and the minus first-order beam are respectively given positive and negative astigmatisms of the same absolute value. By the work of this diffraction grating 3, at least in the direction of the plane of the paper, the plus first-order beam 4b is in a more converged state than the zero-order beam 4a, while the minus first-order beam 4c is in a more diverged state than the zero-order beam 4a. All those beams are passed through a beam splitter 5 and are converged by a focusing lens 6, the focal point of the zero-order beam 4a is denoted by 7a, that of the plus first-order beam 4b is denoted by 7b, and that of the minus first-order beam 4c is denoted by 7c. However, the focal points 7b and 7c are focal lines of the plus first order beam 4b and the minus first-order beam 4c. The reflected beam 10a of the zero-order beam 4a, the reflected beam 10b of the plus first-order beam 4b and the reflected beam 10c of the minus first-order beam 4c all are reflected by the optical disk. Those reflected beam 10a, 10b and 10c pass through the focusing lens 6, and are reflected by the beam splitter 5 and reach photo-detecting elements 11a, 11b and 11c. The photo-detecting element 11a receives the zero-order reflected beam 10a. The photo-detecting element 11b receives the plus first-order reflected beam 10b, and outputs a light quantity signal 12b. The photo-detecting element 11c receives the minus first-order reflected beam 10c, and outputs a light quantity signal 12c. The optical disk 8 has formed therein marks such as pits in depressed form. When the optical disk 8 moves horizontally in the plane of the paper, the light quantity of the plus first-order reflected beam 10b and the first quantity of the minus first-order beam 10c are modulated by the marks, and the light quantity signals 12b and 12c are also modulated. The degrees of modulation of the light quantity signals 12b and 12c can be detected by an envelope detection circuit, for example. The envelope detection circuit detects peak and trough levels of the amplitude of the input signals, and outputs a difference between them, namely, the degrees of modulation of the input signals. Therefore, a modulation degree signal 14b represents the degree of modulation of the plus first-order reflected beam 10b by the marks. Also, the modulation degree signal 14c represents the degree of modulation of the minus first-order reflected beam 10c by the marks. The modulation degree signals 14b and 14c are inputted into the differential operation circuit 15, and outputted from this circuit is used as a focusing error detection signal 16.

The most suitable position of the optical disk 8 (position of a target for focusing) to record or reproduce information using the zero-order beam 4a is the position 9 (2) of the focal point 7a of the zero-order beam 4a. Astigmatisms that the diffraction grating 3 gives to the plus first-order beam 4b and the minus first-order beam 4c have the same value of opposite signs, so that the amounts of deviation of the focal points 7b and 7c from the optical disk 8 are the same. Therefore, with the disk at this position, the degree to which the plus first-order reflected beam 10b and the minus first-order reflected beam 10c are modulated by the marks are the same, so that the levels of the modulation degree signal 14b and 14c are the same, resulting in the focusing error detection signal 16 going to zero level. When the optical disk 8 is shifted to the position 9(1), the degree of modulation of the plus first-order reflected beam 10b increases, the minus first-order reflected beam 10c decreases, resulting in the focusing error detection signal 16 going to a positive level. When the optical disk 8 is at the position 9(1) where the focal point 7b of the plus first-order beam 4b lies, the degree of modulation of the positive is maximum, so that the focusing error detection signal 16 is at the maximum positive level. Conversely, when the optical disk 8 is shifted to the position 9(3), the degree of modulation of the plus first-order reflected beam 10b decreases, and the degree of modulation of the minus first-order reflected beam 10c increases, so that the focusing error detection signal goes to a negative level. When the optical disk 8 is at the position 9(3) where the focal point 7c of the minus first-order beam 4c lies, the degree of modulation of the minus first-order reflected beam 10c is maximum, so that the focusing error detection signal 16 goes to a maximum negative level.

FIGS. 11A and 11B show a state of the surface of the optical disk 8 when the optical disk is shifted to the position 9(3). Reference numeral 210a denotes a main spot, 210b and 210c denote sub-spots, 201 denotes a track, and 212 denotes a pit recorded on the track 201. The pits 212 are aligned for at least several tracks in the radial direction of the disk. FIG. 11A shows a case where three spots correctly move along the center line of the track 201, and the reflected light of the sub-spot 210c is modulated considerably by multiple pits 212. Though not shown, when the optical disk 8 is shifted to the position 9(1), the reflected light of the sub-spot 210b is modulated conspicuously by multiple pits 212. Therefore, when the three spots moves correctly along the center line of the track 201 as shown in FIG. 11A, the focusing error detection signal 16 is in a curve as indicated by the solid line 213. FIG. 11B shows a case where the three spots pass off the center line of the track 201. Also in this case, the reflected light of the sub-spot 210c is modulated conspicuously, the degree of modulation occurs in the same order as in FIG. 11A, and does not show much decrease. Though not illustrated, also when the optical disk 8 in FIG. 10 is shifted to the position 9(1), the reflected light of the sub-spot 210b is modulated by multiple pits 212, and about the same order of the degree of modulation as in FIG. 11A is obtained and shows little decrease. Therefore, also when the three spots 210a, 210b, and 210c pass off the center of the track 201, the focusing error detection signal occurs as shown by the broken line 214, which is substantially the same level as the solid line 213, and the detection sensitivity of at peak or near the focus does not decrease. Therefore, even when off-track occurs, the pull-in motion for automatic focusing control can be performed stably.

As has been described, the astigmatisms that the diffraction grating gives to the plus first-order beam 4b and the minus first-order beam 4c have the same absolute values with opposite signs. Therefore, when the optical disk 8 is at the target point for focusing, the shift amounts of the focal points 7b and 7c are invariably the same, and the degrees of modulation of the plus first-order reflected beam 10b and minus first-order reflected beam 10c by the marks are the same, so that the focusing error detection signal 16 automatically goes to zero level. Therefore, the position setting of the target point for focusing is automatically done, making it unnecessary to adjust the positions of the optical components for focusing. In addition, the photo-detecting elements 11b and 11c have only to receive the total light quantity of the plus first-order reflected beam 10b and the minus first-order reflected beam 10c, and the respective reflected beams may be located at any position of the light-receiving surfaces of the photo-detecting elements. Consequently, even if the optical components are shifted, this theoretically does not cause offset in the focusing error detection signal. Even when off-track occurs, it is still possible to stably effect the pull-in motion for automatic focusing control.

The operation of the magneto-optical signal detection method according to the present invention will now be described qualitatively with reference to FIGS. 15A to 15E.

When linearly polarized light as shown in FIG. 15A is incident on a magneto-optical recording medium, the polarization direction is turned by $+\Theta k$ (or $-\Theta k$) as shown in FIG. 15B depending on the direction of magnetization of the recording medium. This is the principle of magneto-optical signal reproduction by Kerr effect, which principle is generally used in the magneto-optical disk device. On the other hand, when circularly-polarized light is incident on the recording medium, a result is that the reflectivity differs between clockwise and counter-clockwise circularly-polarized beams as shown in FIG. 15c. This effect is referred to as optical dichroism. According to the optical dichroism, when an elliptically-polarized light is incident on the recording medium, the ellipticity $\epsilon$ of the reflected light changes.

This invention is intended for increasing the amount of magneto-optical signal by irradiating elliptically-polarized light as shown in FIG. 15D, utilizing the Kerr effect and the optical dichroism mentioned above and by simultaneously detecting changes in the polarization axis rotation ($+\Theta k$, $-\Theta k$) of the reflected light and the ellipticity.

In addition, by setting a wave plate mentioned above in an adequate manner, the light quantity fed back to the laser light source can be controlled. By this method, laser noise produced by the optical feedback can be suppressed. Moreover, the light quantity guided to the focusing error detecting system can be increased, so that the tracking servo can be stabilized.

BRIEF DESCRIPTION OF THE DRAWINGS

FIG. 1 shows a schematic arrangement of the optical head according to the present invention;

FIG. 4 is a block diagram showing an arrangement of the envelope detection circuit;

FIGS. 5A to 5E show the states of input signals in FIG. 4;

FIGS. 6A to 6C are partial plan views showing the relation between pits and light spots on an optical disk;

FIGS. 14A to 14C are schematic diagrams indicating problems of the prior art;

DESCRIPTION OF THE PREFERRED EMBODIMENTS

Figure 2A:
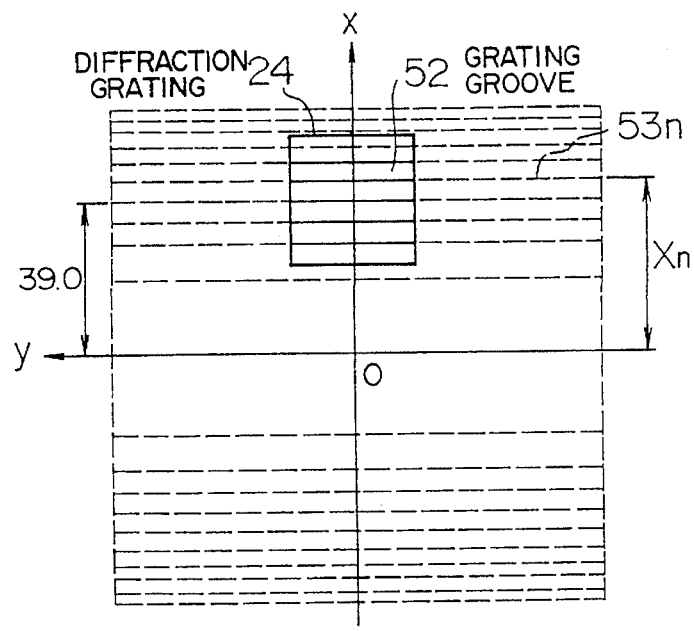
FIGS. 2A and 2B show arrangements of the unequally-spaced straight groove type diffraction grating.

An embodiment of the present invention will be described with reference to FIGS. 1 to 9.

FIG. 1 a diagram of an embodiment of the optical head according to the present invention which is illustrated for convenience of explaining the method for detecting a focusing error signal. Reference numeral 21 denotes a semiconductor laser which emits a laser beam with a wavelength of 780 nm, for example. The laser beam emitted is projected onto an optical disk by a focusing optical system. A collimator lens 22 converts the laser beam emitted from the semiconductor laser 21 into a collimated beam 23 having a diameter of 5 mm. A unequally-spaced straight groove diffraction grating 24 with an effective area of 5 mm square, which has straight grooves arranged perpendicularly to the face of the paper, separates the collimated beam 23 into a zero-order beam 23a, a plus first-order beam 25b and a minus first-order beam 25c, and diffracts the plus and minus first-order beams 25b and 25c in the direction of ±0.745°. Also the diffraction grating 24 functions as a positive cylindrical lens with a focal distance of +3000 mm for the plus first-order beam 25b to give positive astigmatism to it, and also functions as a negative cylindrical lens with a focal distance of −3000 mm for the minus first-order beam 25c to give negative astigmatism to it. Each beam passes through a beam splitter 26, is reflected by a mirror 27, and is focused by a focusing lens 28. The focusing lens 28 has a focal distance of 3 mm, for example and a numerical aperture NA of 0.55. The zero-order beam 25a is focused at a focal point 29a. The plus first-order beam 25b, having positive astigmatism, is focused in a focal line 29b at the position near the focusing lens 28. The minus first-order beam 25c, having negative astigmatism, is focused in a focal line 29c at the position remote from the focusing lens 28. The optical disk 30 has a diameter of e.g. 5 inches and is formatted for sampled servo. Spirally formed on the recording surface of the optical disk 30 is a track (recording area) with a track pitch of 1.5 μm. One round of the track is divided into 32 sectors, each sector being divided into 43 segments. At the beginning of each segment, at least a pair of pre-wobbled pits 93a and 93b are arranged at the positions deviating to left and right from the track center by ¼ track (see FIG. 6). The zero-order beam 25a, plus first-order beam 25b and the minus first-order beam 25c are reflected by the optical disk 30. Reflected beams 31a, 31b and 31c of the zero-order beam 25a, plus first-order beam 25b and minus first-order beam 35c are passed through the focusing lens 28, reflected by the mirror 27, and also reflected by the beam splitter 26 to be separated from the beams projected onto the optical disk 30. The reflected beams thus separated are converged by e.g. a convex lens 32 to be directed to a detection optical system. A photo-detecting element 33a for receiving the zero-order reflected beam 31a outputs a light quantity signal 34a proportional to the light quantity of the zero-order reflected beam 31a. A photo-detecting element 33b for receiving the plus first-order reflected beam 31b outputs a light quantity signal 34b proportional to the light quantity of the plus first-order reflected beam 31b. A photo-detecting element 33c; for receiving the minus first-order reflected beam 31c outputs a light quantity signal 34c proportional to the light quantity of the minus first-order reflected beam 31c. The optical disk 30 rotates (moves in the horizontal direction of the paper) at the speed of e.g. 2400 rpm by a motor, not shown, so that the light quantities of the zero-order reflected beam 31a, the plus first-order reflected beam 31b and the minus first-order reflected beam 31c are modulated, and hence, the light quantity signals 34a, 34b and 34c from the photo-detecting elements 33a, 33b and 33c are also modulated, respectively. Reference numerals 35b and 35c indicate envelope detecting circuits. The envelope detecting circuit 35b detects the degree of modulation of the plus first-order reflected beam 31b to output a modulation degree signal 36b, whereas the envelope detecting circuit 35c detects the degree of modulation of the negatived first-order reflected beam 31c to output a modulation degree signal 36c. A differential operation circuit 37 performs subtraction between the modulation degree signals 36b and 36c to output a focusing error detection signal 38. A sampled servo circuit 39 outputs a off-track circuit 40 on the basis of the light quantity signal 34a for the zero-order reflected beam 31a. A two-dimensional lens actuator 41 comprises an AF (auto-focusing) drive mechanism 42 having a coil and a magnet for shifting the focusing lens 28 in the direction of the optical axis, and a TR (tracking) drive mechanism having a coil and a magnet for shifting the focusing lens 28 in the radial direction of the optical disk.

Figure 2B:
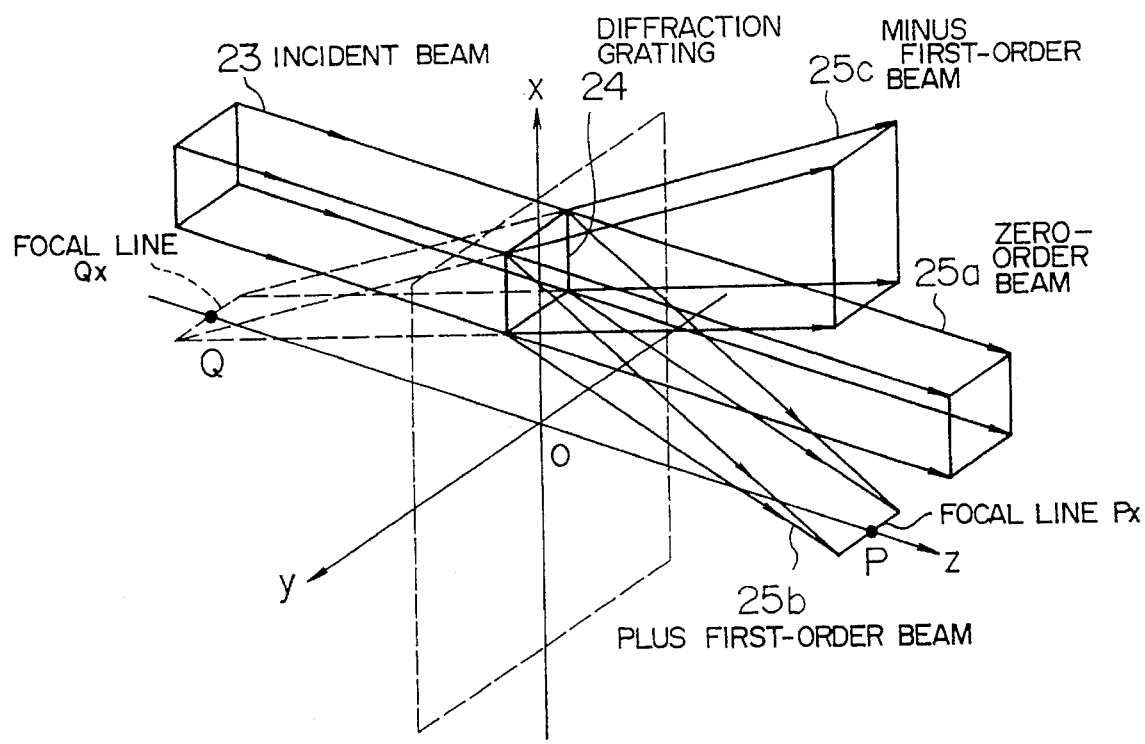
Figure 3:
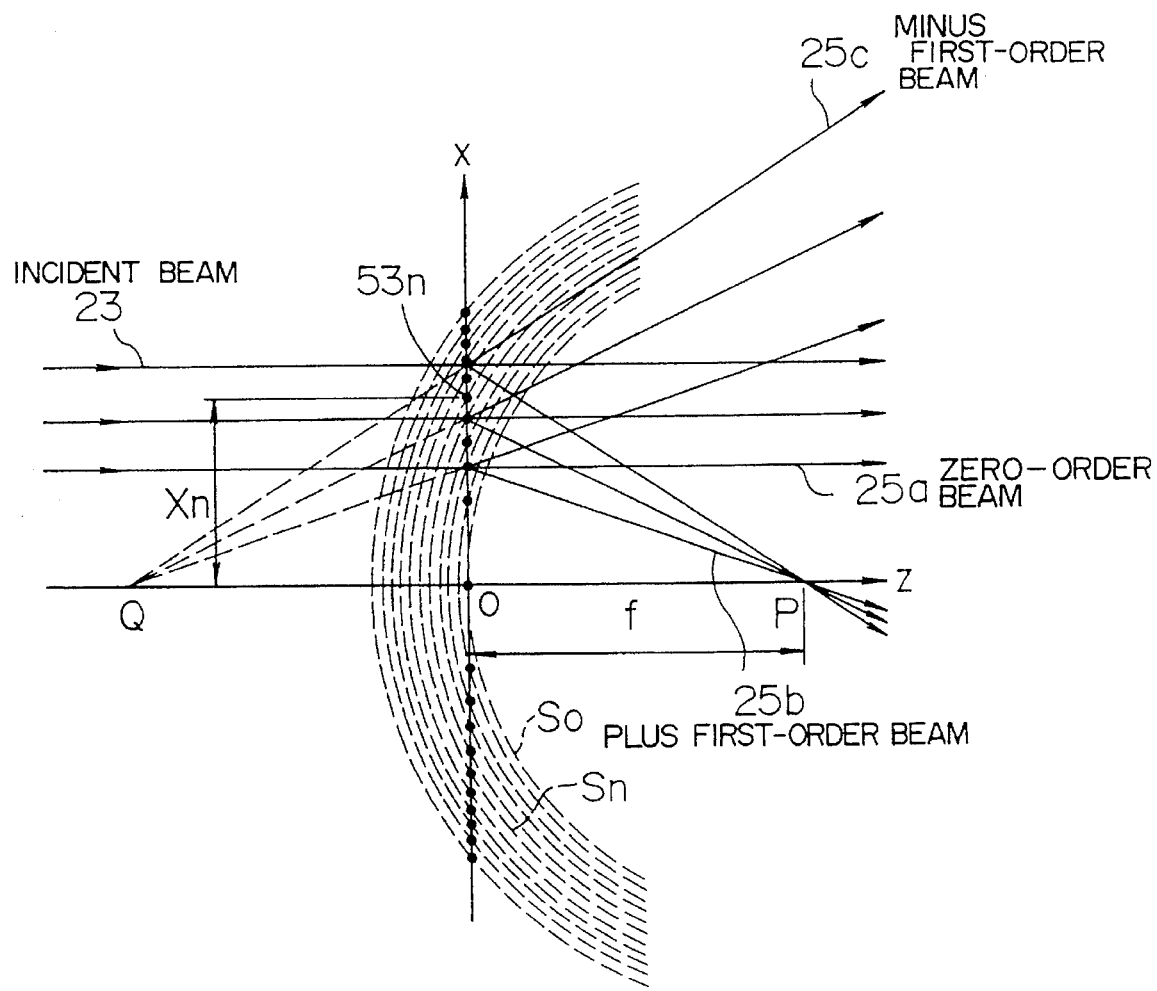
FIG. 3 is a partial plan view showing the relation between the diffraction grating shown in FIGS. 2A and 2B and light spots.

Referring now to FIGS. 2A, 2B and 3, description will be made of the structure and operation of an unequally-spaced straight groove type diffraction grating 24. An X-axis and a Y-axis are taken in the plane including the diffraction grating 24. A Z-axis is taken in the traveling direction of the beam, and 0 is taken as the origin of the coordinates in design. FIG. 2A shows an X-Y plane, in which a number of grating grooves 52 formed in the diffraction grating 24 are part of the straight lines 53n (n=±1, ±2, ±3, . . . ) parallel with the Y-axis. Since function of the diffraction grating 24 is uniform in the Y-axis direction, the function will be explained using the X-Y plane shown in FIG. 3. In FIG. 3, the point on the Z-axis apart by f from the origin 0 is represented by P, and a circle with a diameter f having the point P as its center is represented by SO. Assuming that the wavelength of the beam 23 is λ, the circles each with a diameter of (f+n) having the point P as their center are represented by Sn (n=1, 2, 3, . . . ). Assume that intersections of the circles Sn and the X-axis are a group of straight lines 53n. The beams incident on the X-Y plane are diffracted by the group of straight lines 53n. Then, the beams converging at the point P, which are in the same phase at the point P and strengthened by each other, result in plus first-order diffracted beams 25c. On the other hand, the beams which are diffracted by the group of lines 53n in the direction opposite to the plus first-order diffracted beams 25b result in the minus first-order diffracted beams 25c diverging from the point Q on the Z-axis apart by −f from the origin because of symmetry of the diffraction angle of the diffraction grating. Thus, as shown in FIG. 2B, the unequally-spaced straight groove type diffraction grating functions as a positive cylindrical lens having a focal line distance f for the plus first-order beams 25b to give positive astigmatism to them; the plus first-order diffracted beams 25b are focused in a focal line Px. In contrast, the diffraction grating 24 functions as a negative cylindrical lens having a focal distance of −f for the minus first-order diffracted beams 25c to give negative astigmatism to them, the minus first-order diffracted beams 25c result in the beams diverging from a focal line Qx.

As shown in FIG. 3, the distance Xn of the n-th grating groove 52 from the origin 0 can be expressed by $$Xn = \sqrt{\{(f+n\lambda)^2 - f^2\}}$$

Therefore, by substituting the focal line distance of f=3000 mm of the cylindrical lens and the wavelength λ=0.00078 mm (780 nm) into the above equation, any Xn can be calculated. On the other hand, assuming that the diffraction angle Θ=0.745°, the center of the diffraction grating is located at the position of f * tanΘ=39.0 mm. If the size of the diffraction grating of 5 mm is taken into consideration. Xn is within the range of 39.5 mm ≦Xn≦41.5 mm. The values of Xn calculated within this range are shown in Table 1. In Table 1, ΔXn denotes a grating groove pitch, which is 60.0 μm at the center of the diffraction grating, and decreases from 64.1 μm to 56.4 μm as the distance from the origin 0 increases.

TABLE 1

| n | Xn (mm) | ΔXn (mm) |
|---|---|---|
| 368 | 41.50087 | |
| | | 0.05643 |
| 367 | 41.44444 | |
| | | 0.05650 |
| 366 | 41.38794 | |
| | | 0.05658 |
| 365 | 41.33136 | |
| . | . | . . |
| . | . | . |
| . | . | . |
| 327 | 39.12065 | |
| | | 0.05987 |
| 326 | 39.06078 | |
| | | 0.05996 |
| 325 | 39.00082 | |
| | | 0.06005 |
| 324 | 38.94077 | |
| | | 0.06014 |
| 323 | 38.88063 | |
| . | . | . |
| . | . | . |
| 287 | 36.64983 | |
| | | 0.06391 |
| 286 | 36.58592 | |
| | | 0.06402 |
| 285 | 36.52190 | |
| | | 0.06413 |
| 284 | 36.45777 | |

The diffraction grating 24 can be fabricated by making a mask pattern of grating grooves on the basis of data in Table 1 using an electron beam lithography system, exposing the photoresist on a glass substrate through the mask pattern using an irradiation apparatus, and thereafter making development. Meanwhole, the group of lines 53n can be regarded as interference fringes resulting from interference of the incident beams 23 on the X-Y plane with the beams converging in the focal line Px or diverging from the focal line Qx. Therefore, the diffraction grating 24 can be fabricated by the technique of making a hologram. Specifically, the diffraction grating 24 can be fabricated in such a manner that with a hologram photosensitive plate located on the X-Y plane in FIG. 2B, the beams which are directly incident on the photo-sensitive plate line the incident beams 23 are caused to interfere, on the photo-sensitive plate, with the beams converging in the focal line Px like the plus first order beams 25b, or the beams which are directly incident on the photo-sensitive plate like the incident beams 23 are caused to interfere,-on the photo-sensitive plate, with the beams diverging from the focal line Qx like the minus first-order beams 25c.

Description will now be made of the envelope detection circuits 35b and 35c. FIG. 4 is a block diagram of the envelope detection circuits 35b and 35c. In operation, an input signal 100 corresponding to the light quantity signal 34b or 34c is amplified by an amplifier 101 and differentiated by an differentiation circuit 103. The high frequency noise of a differentiated signal 104 from the differentiation circuit 103 is removed by a filter 105 and input into a bipolar zero level comparator 106 to provide a pulse signal 107. FIG. 5A shows an example of the input signal 100. FIG. 5B shows its differentiated signal 104. FIG. 5C shows the pulse signal 107. In FIGS. 5A to 5E, the same time base is used to express the elapse of time in the rightward direction of the paper. When the input signal 100 becomes a maximum or minimum value, the differentiated signal 104 goes to zero level shown by the dotted line 125. Whenever the differentiated signal passes the zero level, the zero level comparator 106 outputs a pulse 126. The pulse signal 107 is supplied to a flip-flop circuit 108. Whenever the pulse 126 is inputted into the flip-flop circuit 108, its Q terminal repeats either a high level or a low level. Therefore, if the Q terminal output and the pulse signal 107 are inputted to an AND circuit 109, a pulse signal 110 is outputted for every other pulse 126 as shown in FIG. 5D. If the output 102 from the amplifier 110 is sampled at the timing of the pulse signal 110 by a sample-and-hold circuit 111, the sample-and-hold circuit 111 outputs a level signal 112 for holding the lower level of the amplitude of the input signal 100 indicated by round dots 113 in FIG. 5A.

On the other hand, whenever the pulse 126 of the pulse signal 107 is inputted into the flip-flop circuit 108, the $\bar{Q}$ terminal repeats a high or low level in a manner opposite to the case with the Q terminal. Therefore, if the $\bar{Q}$ terminal output and the pulse signal 107 are inputted to an AND circuit 114, a pulse signal 115 is outputted for every other pulse 126 in the manner opposite to the pulse signal 110 as shown in 5E. If the output 102 from the amplifier 101 is sampled at the timing of the pulse signal 115 by a sample-and-hold circuit 111, the sample-and-hold circuit 111 procedures a level signal 117 holding the upper level of the amplitude of the input signal 100 indicated by triangle dots 113 in FIG. 5A. Thus, if he level signals 117 and 112 are inputted into the differential operation circuit 118, an amplitude signal 119 corresponding to the amplitude of the input signal 100 can be obtained. However, as the case may be, owing to different timings of the pulse signals 110 and 115, the level signal 112 may hold the upper level of the input signal 100 whereas the level signal 117 may hold the lower level thereof, thereby providing a negative amplitude signal. In order obviate this problem, a switch circuit 121 is used which selects its A terminal if a control signal is positive and selects its B terminal if the control signal is negative. If the amplitude signal 119 is inputted to the A terminal, to the B terminal through an inverter 120 and to the control terminal of the switch 121, an output signal 122 which can always represent the amplitude signal by a positive value is obtained from the switch circuit 121. The output signal 122 represents the quantity of the reflected light modulated by the marks such as pre-wobbled pits, and hence corresponds to the modulation degree signal 36b or 36c.

Description will next be made of automatic focusing control according to this embodiment. FIGS. 6A to 6C show the recording surface of the optical disk 30. As described above, one round of the recording area of the optical disk 30 is divided into 32 sectors each comprising 43 segments. At the beginning of each segment, pre-wobbled pits 93a and 93b in depressed form are arranged on a track 92 indicated by dotted line. The pre-wobbled pits 93a and 93b are aligned for at least several tracks in the radial direction (in the vertical direction in the plane of the paper) of the optical disk 30. The pitch of the track 92 is 1.5 µm. The pit 93a deviates from the track center by ¼ track toward the top of the paper whereas the pit 93b deviates from the track center by ¼ track toward the bottom of the paper. A light spot 91a is projected by the zero-order beam 25a, a light spot 91c by the plus first-order beam 25b and a light spot 91c by the minus first-order beam 25c. When the pits 93a and 93b pass the light spots 91a, 91b and 91c, the light quantities of the zero-order reflected beam 31a, the plus first-order beam 31b and the minus first-order beam 31c are modulated. FIG. 6B shows the recording surface of the optical disk 30 when the disk is located at the focus 29a of the zero-order beam 25a, in which case the area of the spot 91a is smallest and the disk is at the position (target position for focusing) most suitable for recording and reproducing information. Since the diffraction grating 24 operates in the direction of he track 92, the plus first-order beam 25b and the minus first-order beam 25c are most converged at this disk position in the direction perpendicular to the track (vertical direction) but not converged in the track direction (horizontal direction). Thus, the light spots 91b and 91c have the same size and are long in the track direction. Accordingly, the plus first-order reflected beams 31b and the minus first-order reflected beam 31c are modulated by the same degree of modulation by the pits 93a and 93b. FIG. 6A shows the recording surface of the optical disk 30 when the disk 30 is located at the focal line 29c of the minus first-order beam 25c, in which case the spot 91c is in the form of a focal line which is vertically long. The pits 93a and 93b are aligned for at least several tracks in the radial direction (in the vertical direction in the plane of the paper) of the disk, the negative reflected beam 31c is most greatly modulated. Since the light spot 91b is larger horizontally than in the case in FIG. 6B, the degree of modulation of the positive reflected beam 31b is smaller than in the case of FIG. 6B. On the other hand, FIG. 6C shows the recording surface of the disk 30 when the disk is located at the focal line 29b of the plus first-order beam 25b. The light spot 91b is in a focal line which is vertically long, so that the plus first-order reflected beam 31b is most greatly modulated. Since the light spot 91c is horizontally much larger than in the case of FIG. 6B, the degree of modulation of the minus first-order beam 31c is smaller than in the case of FIG. 6B.

Figure 7A:
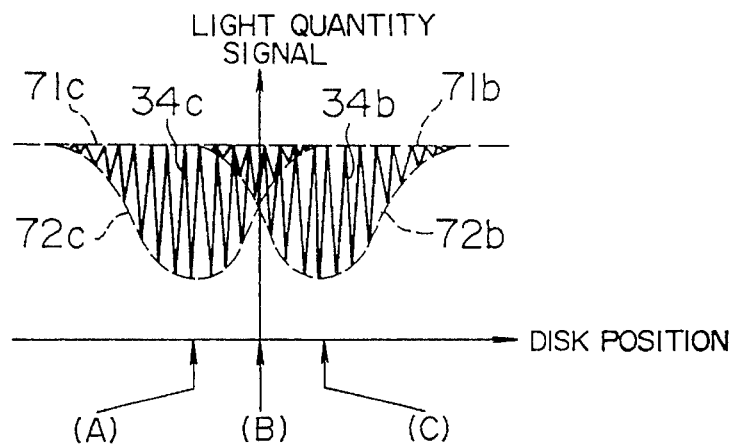
FIGS. 7A to 7C show changes of degree of modulation of a light quantity signal.

FIG. 7A shows changes in the degrees of modulation of the light quantity signals 34b and 34c by the pits 93a and 93b when changes in of the position of the optical disk are plotted on the axis of abscissa. In FIG. 7A (A) of the axis of abscissa denotes the position of the focal line 29c of the negative first-order beam 25c, (B) denotes the position of the focus 29a of the zero-order beam 25a which is the target position for focusing, and (C) denotes the position of the focal line 29b of the plus first-order beam 25b. Assuming that the focal distance when the diffraction greating 24 functions as a cylindrical lens for plus and minus first-order beams is f and the focal distance of the focusing lens 28 is fo, if f is much larger than fo (f>>fo), a difference δ between the focal line 29b and 29c and the focus 29a can be expressed by $$\delta = fo^2/f$$

Figure 7B:
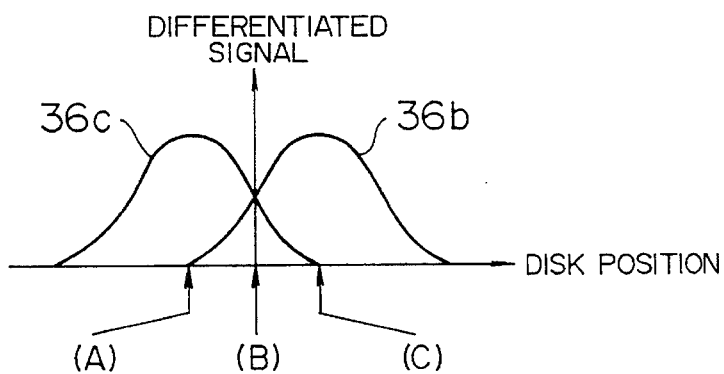

In this embodiment, f=3000 mm, fo=3 mm so that δ=3 µm. Therefore, the distance between the target position (B) on the abscissa and the position (A) of the focal line 29c of the position (C) of the focal line 29b is ±3 µm. When the laser beams with a wavelength of 780 nm or so are converged by the focusing lens 28 having a numerical number (NA) of 0.55 or so, if a focusing error of about 2 µm to 3 µm occurs, the degree of modulation by the pits is decreased to about half. When the disk is at the position (A), the minus first-order reflected beams 25c are most greatly modulated so that the amplitude of the light quantity signal 34c is maximum. When the disk is at the position (C), the plus first-order reflected beams 25b are most greatly modulated so that the amplitude of the light quantity signal 34b is maximum. When the disk is at the position (B), the deviations from the focal lines of the plus first-order beam 25b and the minus first-order beam 25c are 3 µm, the amplitude of the light quantity signals 34b and 34c are equal and are decreased to about half of the maximum amplitude. The light quantity signals 34b and 34c are supplied to the envelope detection circuits 35b and 35c described with reference to FIG. 5. The envelope detection circuit 35b detects the peak levels 71b and the bottom levels 72b of the amplitude of the light quantity signal 34b in FIG. 7A to output differences between them, i.e., the modulation degree signal 36b of the light quantity signal 34b. The envelope detection circuit 35c detects the peak levels 71c and the bottom levels 72c of the amplitude of the light quantity signal 34c in FIG. 7A to output difference between them, i.e., the modulation degree signal 36c of the light quantity signal 34c. FIG. 7B shows the modulation degree signals 36b and 36c obtained by envelope detection circuits 35b and 35c. As seen from FIG. 7B, the modulation degree signal 36b has a maximum value at the disk position (A) whereas the modulation degree signal 36c has a maximum value at the disk position (C). The modulation degree signals 36b and 36c have half of the maximum value at the disk position (B) which is the target position for focusing. Therefore, if the modulation degree signals 36b and 36c are inputted to the differential operation circuit 37a, a focusing error detection signal as indicated by the solid line 38 in FIG. 7C. When the optical disk 30 is located at the target position (B) for focusing, the focusing error detection signal 38 automatically goes to zero level. Thus, using this focusing error detection signal 38, the AF driving mechanism 42 of the two-dimensional actuator 41 is driven to move the focusing lens 28 in its optical axis so that automatic focusing control can be carried out. In an ordinary optical disk device, the response frequency required for the automatic focusing control system is 2 kHz or so. On the other hand, in this embodiment, the number of segments on which the pre-wobbled pits 93a and 93b are arranged is 32×43=1376 for one round of track, and the rotating speed of the optical disk 30 is 2400 rpm (40 Hz). Therefore, sampling frequency of the focusing error detection signal is about 55 kHz. Thus, according to this embodiment, automatic focusing control can be implemented in a sufficiently stable manner.

As can be understood from the above description in this embodiment, the photo-detecting elements 33b and 33c have only to receive the total light quantities of the plus first-order reflected beam 31b and the minus first-order reflected beam 31c, and the target for focusing can be automatically adjusted without adjusting the positions of the photo-detecting elements. Even if the photo-detecting elements are shifted from the mounted positions, this does not cause any detection error in the focusing error detection signal. Further, the focusing error detecting method according to this embodiment can also be applied to the waveguide type optical head.

With reference to FIGS. 8 and 9A to 9J, description will be made of tracking control in this embodiment.

Figure 8:
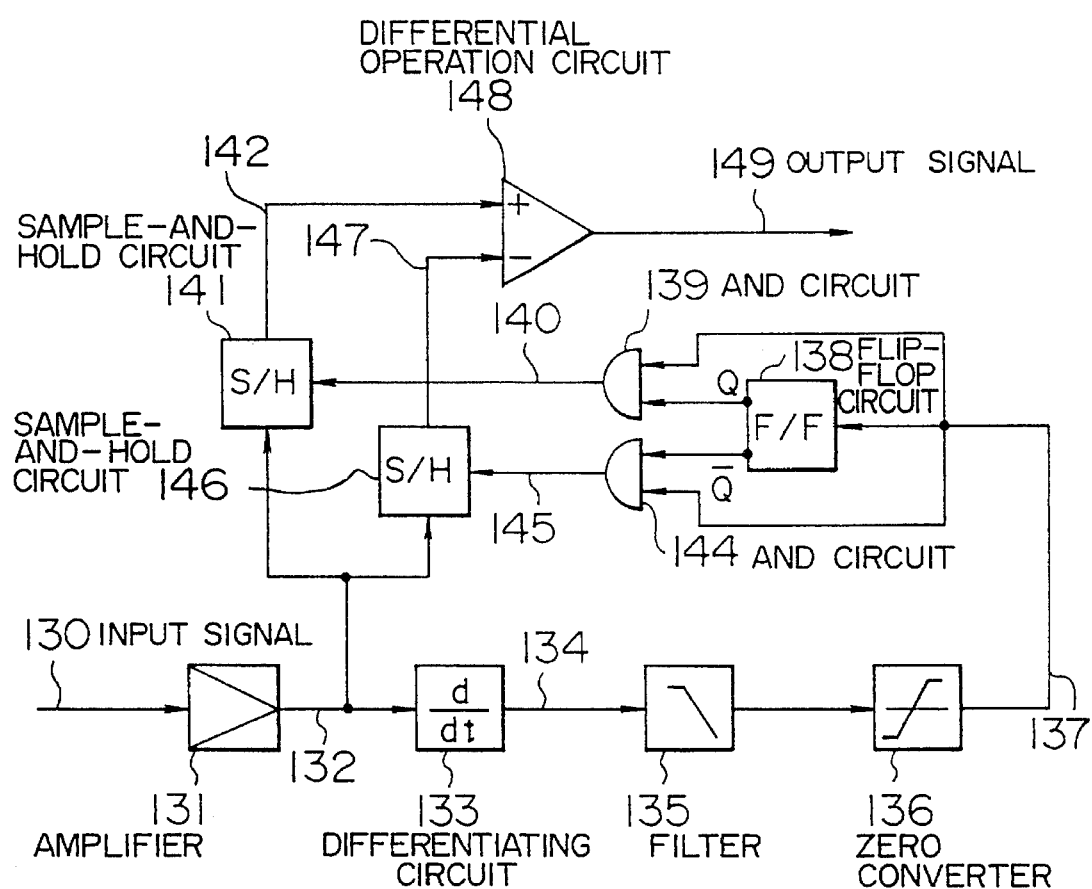
FIG. 8 is a block diagram showing the arrangement of the sampled serve circuit of FIG. 1.
Figure 9A:
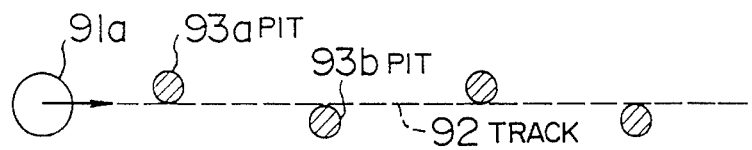
FIGS. 9A to 9J are diagrams for explaining tracking control.
Figure 9B:
Figure 9C:
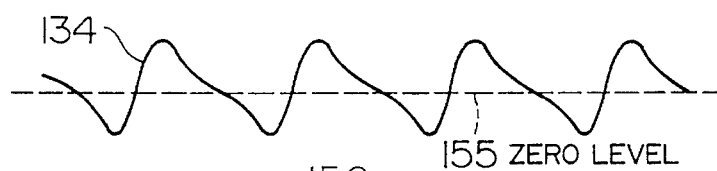
Figure 9D:
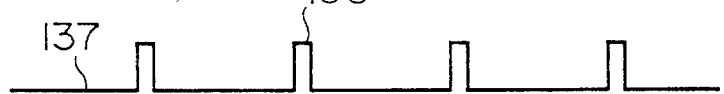
Figure 9E:
Figure 9F:
Figure 9G:
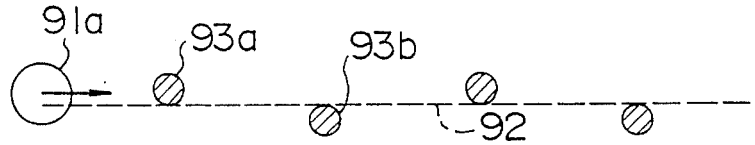
Figure 9H:
Figure 9I:
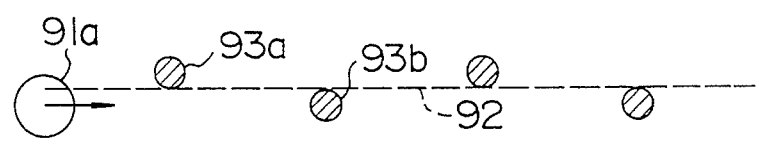
Figure 9J:
Figure 10:
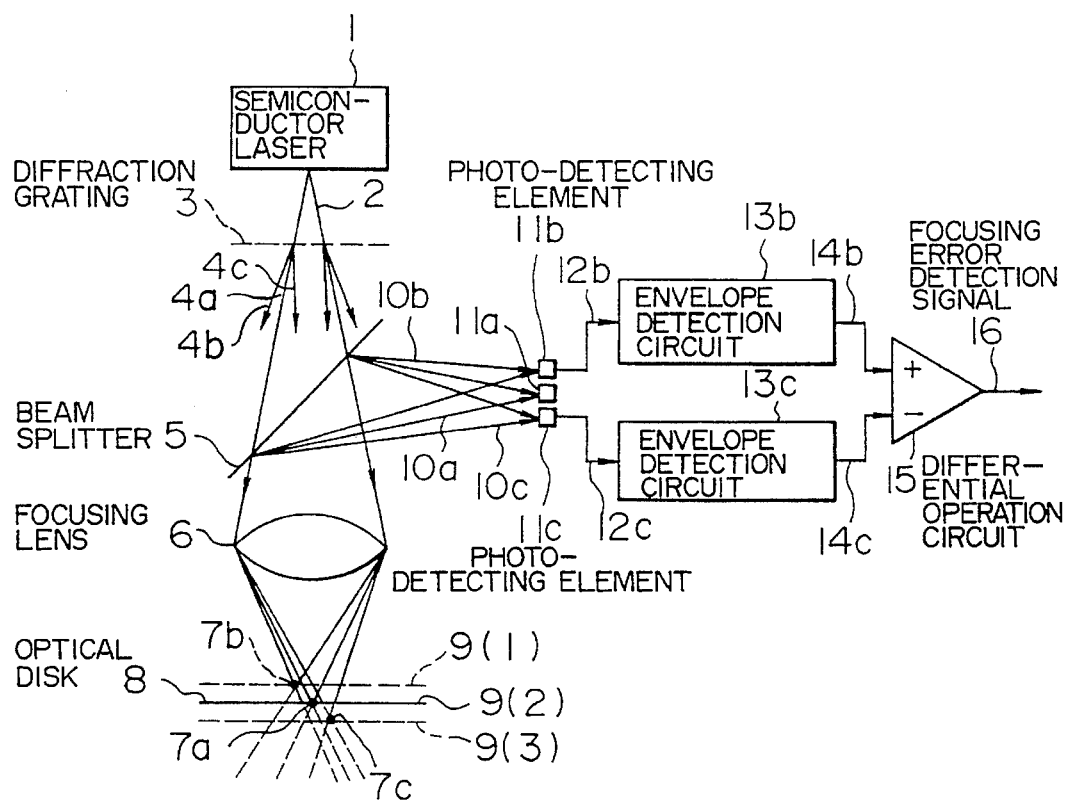
FIG. 10 is a diagram showing the principle of the focusing error detection method according to the present invention.
Figure 11A:
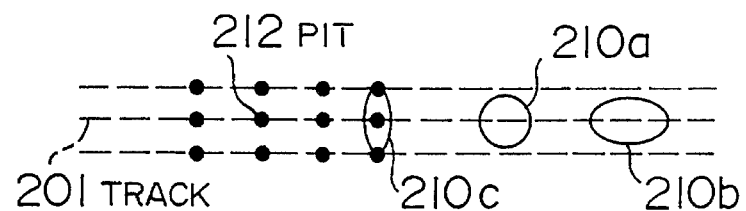
FIGS. 11A to 11C partial plan views showing the relation between pits and light spots on the optical disk.
Figure 11B:
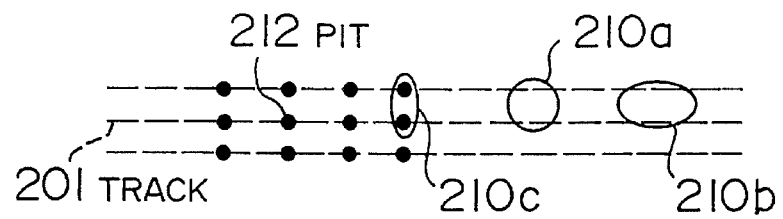
Figure 11C:
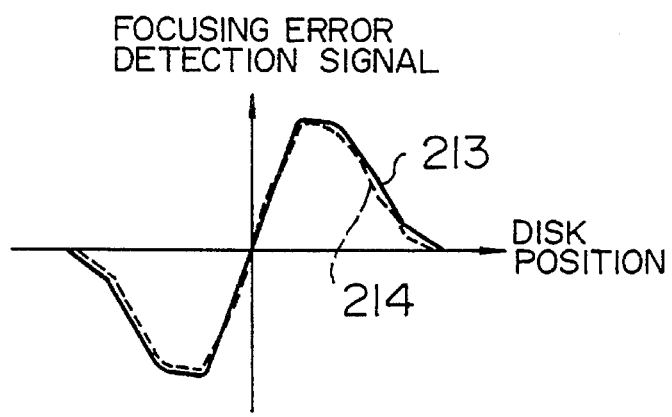

FIG. 8 is a block diagram of the sampled servo circuit 39 shown in FIG. 1. In operation, an input signal 130 is amplified by an amplifier 131 and differentiated by a differentiation circuit 133. The high frequency noise of a differentiated signal from the circuit 133 is removed by a filter 135 and input to a rising zero level comparator 136 to provide a pulse signal 137. FIG. 9A shows that part of the recording surface of the optical disk 30, shown in FIG. 6A, which is related to tracking control, in particular. Reference numeral 91a denotes a light spot of the zero-order beam 25a, 92 a track center, 93a denotes a pit at a position deviating from the tack center by ¼ track toward the top of the paper, and 93b denotes a pit deviating from the track center by ¼ track toward the bottom of the paper. This is a case in which the light spot 91a travels right above the track center 92 (target for tracking control) in the rightward direction of the paper. FIG. 9B shows an example of the input signal 130. FIG. 9C shows its differentiated signal 134. FIG. 9D shows the pulse signal 137. In FIGS. 9A to 9J, the same time base is used to express the passage of time in the rightward direction of the plane of the paper. When the input signal 130 becomes a maximum or minimum value, the differentiated signal goes to zero level shown by the dotted line 155. Whenever the differentiated signal 134 passes the zero level 155 from a negative level to a positive level, the rising zero level comparator 136 outputs a pulse 156. The pulse signal 137 is inputted to a flip-flop circuit 138. Whenever the pulse 156 of the pulse signal is inputted to the flip-flop circuit 138, its terminal repeats either a high level or a low level. Therefore, if the Q terminal output and the pulse signal 137 are inputted to an AND circuit 139, a pulse signal 140 is outputted for every other pulse 156 as shown in FIG. 9E. If the output 132 from the amplifier 131 is sampled at the timing of the pulse signal 140 by a sample-and-hold circuit 141, the sample-and-hold circuit 141 outputs a level signal 142 holding the modulated level by the pit 93a indicated round dots 143 in FIG. 9B. On the other hand, whenever the pulse 156 of the pulse signal 137 is inputted to the flip-flop circuit 138, the Q terminal repeats either a high or low level in a manner opposite to the case with the Q terminal. Therefore, if the Q terminal output and the pulse signal 137 are inputted to an AND circuit 144, a pulse signal 140 is produced for every other pulse 156 in the manner opposite to the pulse signal 140 as shown in FIG. 9F. If the output 132 from the amplifier 131 is sampled at the timing of the pulse signal 145 by a sample-and-hold circuit 146, the sample-and-hold circuit 146 produces a level signal 147 holding the modulated level by the pits 93b indicated triangle dots 148 in FIG. 9B. Thus, if the level signals 147 and 142 are supplied to a differential operation circuit 148, an output signal from this circuit can be used as the off-track detection signal 40. The pits 93a and 93b deviate from the track center 92 by the same amount. Therefore, when the spot 91a travels right above (target for tracking control) the track 92, the modulation levels 143 and 148 by the pits 93a and 93b are equal, so that the tracking error detection signal 40 (149) automatically goes to zero level. If the spot 91a deviates from the track toward the top of the paper as shown in FIG. 9G, the beam is more greatly modulated by the pits 93a, so that the corresponding modulation level 143 goes to a lower level; however, the beam is not so greatly modulated by the pits 93b, so that the corresponding modulation level 148 goes to a higher level. Thus, the off-track detection signal 40 (149) goes to a negative level. On the other hand, if the spot 91a deviates from the track toward the bottom of the face of the paper as shown in FIG. 9I, the beam is not so greatly modulated by the pits 93a, so that the corresponding modulation level 143 goes to a higher level as shown in FIG. 9J; however, the beam is more greatly modulated by the pits 93b, so that the corresponding modulation level 148 goes to a lower level. Thus, the off-track detection signal 40 (149) goes to a positive level. Thus, the off-track detection signal 40 (149) has a positive level. Using this off-track detection signal 40 to drive the TR driving mechanism 43 of the two-dimensional actuator 41, the focusing lens 28 is moved in the radial direction of the disk, so that automatic tracking control can be carried out. In an ordinary optical disk device, the response frequency required for the automatic tracking control system is 8kHz or so. On the other hand, in this embodiment, the sampling frequency of the off-track detection signal is about 55 kHz which is equal to that of the focusing error detection signal. Therefore, according to this embodiment, automatic tracking control can be performed in a sufficiently stable manner. In the off-track detection method according to this embodiment, the photo-detecting element 33a has only to receive the total light quantity of the zero-order reflected light beam 31a, and the target for tracking can be automatically adjusted without adjusting the position of the photo-detecting element 33a. A displacement of the photo-detecting elements from the position where they are mounted causes no offset in the off-track detection signal.

Also in the optical disk to which this embodiment is applied, information can be recording and reproduced in the same manner as in ordinary optical disk devices. Specifically, this embodiment can be applied to a write-once type optical disk, a magneto-optical disk, a phase-change optical disk. etc. regardless of the kind of the recording film on an optical disk. As an example, a case in which a write-once optical recording medium is used will be described. When recording information, a pulse-like driving current adapted to information is conducted through the semiconductor 21 to modulate the intensity of the laser beam in a pulse shape, and using the light spot 91a of the zero-order beam 25a, the recording film on the optical disk 30 is thermally board to record information as holes. When reproducing information, the semiconductor laser is caused to emit the laser beam by using a predetermined, low power. Likewise, using the light spot 91a of the zero-order beam 25a, the light quantity of the reflected beam 31a is modulated by the holes representing information recorded; therefore, information can be represented on the basis of changes in the light quantity signal 34a. When a phase-change optical recording medium is used, only difference of which from the above case is that information is recorded as changes in the reflectively not as holes, the optical head used in this embodiment can be used as it is. When a magneto-optical recording medium is used, information is recorded and reproduced as follows. In order to record information, a magnetic field is applied to the magneto-optical recording medium by a magnetic field applying means provided on the side opposite to the focusing lens 28 with respect to the optical disk 30, thereby reversing the magnetizing direction of a vertically-magnetized film. Also, in order to reproduce the information, the flux reversals recorded as information in the magnetic film is detected on the basis of the Kerr effect. More specifically, in the detection optical system, the reflected beams 31a corresponding to the light spot 91a are polarized and separated into two polarized light components perpendicular to each other, and the separated beams are received by separate photo-detecting elements, and from output difference signals, information can be reproduced.

As has been described, in this embodiment, targets for focusing in focusing control and for tracking in tracking control can be automatically adjusted, so that adjusting the positions of the optical components such as the photo-detector and lenses, which must be done in the conventional optical head assembling process, need not be performed. A displacement of the optical components from the position where they are mounted does not cause offset in the focusing error detection signal or the off-track detection signal. Further, this embodiment can be applied to the waveguide type optical head.

Figure 12A:
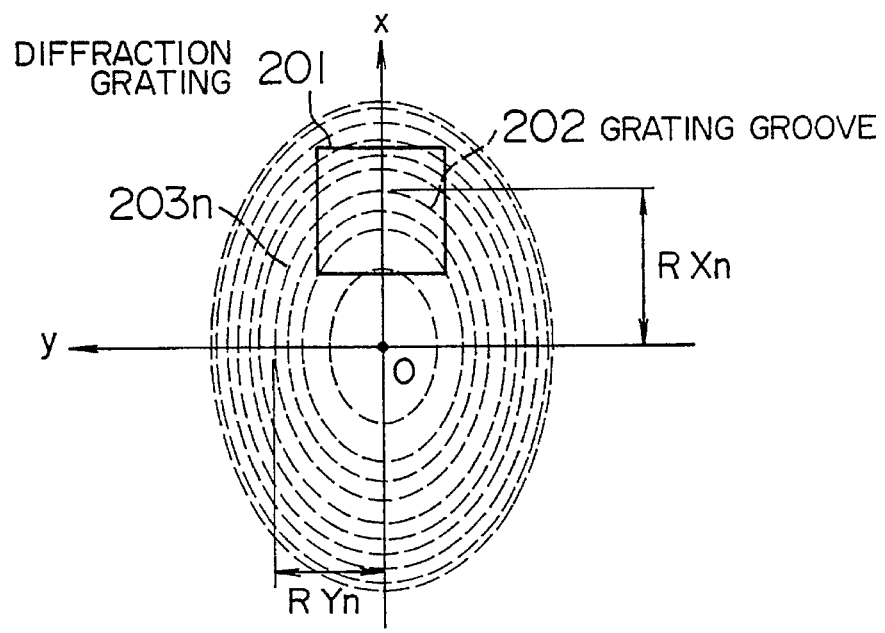
FIGS. 12A and 12B show arrangements of the unequality-spaced concentric elliptic groove type diffraction grating.

Referring to FIGS. 12A, 12B, 13A to 13E, a second embodiment of the present invention will be described. In the second embodiment, an unequally-spaced concentric elliptic groove type diffraction grating 201 as shown in FIG. 12A is used instead of an unequally-spaced straight groove type diffraction grating 24 of FIG. 2A used in the first embodiment. The configuration and functions of the other components will not be described here since they are exactly the same as in the first embodiment.

The grating grooves 202 of the concentric elliptic groove type diffraction grating 201 is a part (elliptic arc) of a concentric ellipse 203n(n=1, 2, 3, ...) with the origin 0 as its center as indicated by the dotted line in FIG. 12A. An X-axis and a Y-axis are taken respectively in the directions of the major axis and the minor axis of the ellipse 203n in the plane including the diffraction grating 201, while a Z-axis is taken in the direction in which the beam travels. The coordinate origin is taken at the zero point. The radius RXn (n=1, 2, 3, ...) in the direction of its major axis is expressed by $$RXn = \sqrt{\{(fx + n\lambda)^2 - fx^2\}}$$

and the radius RYn (n=1, 2, 3, ...) of the ellipse 203n in the direction of its minor axis is expressed by $$RYn = \sqrt{\{(fy + n\lambda)^2 - fy^2\}}$$

where fy<fx

Figure 12B:
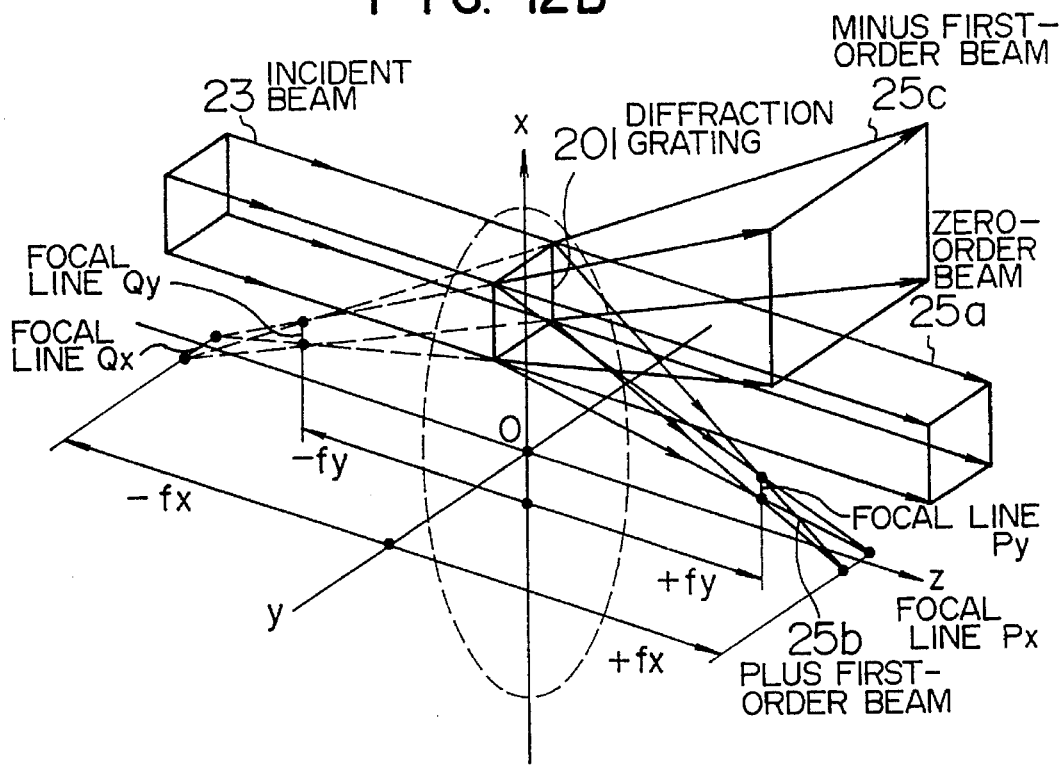

Then, as described with reference to FIG. 3, in the X-Y plane, the plus first-order beams 25b are converged at the point apart from the origin 0 by fx on the Z-axis, the minus first-order beams 25c are diverged as if they emerged from the point apart by −fx on the Z-axis from the origin 0. On the other hand, in the Y-Z plane, the plus diffracted beams 25b are converged at the point apart by fy on the Z-axis from the origin 0, and the minus first-order beams 25c are diverged as if they emerged from the point apart by −fy on the Z-axis from the origin 0. Thus, as shown in FIG. 12B, the plus first-order beams 25b are converged in a focal line Px in the X-direction and in a focal line Py in the Y-direction, while the minus first-order beams 25c are diverged in the X-direction as if they emerged from a focal line Qx and also in the Y-direction as if they emerged from a focal line Qy. In this way, the concentric elliptic groove type diffraction grating 201 functions as a positive toroidal lens with focal distances fx and fy for the plus first-order beams 25b, while the concentric elliptical diffraction grating 201 functions as a negative toroidal lens with focal distances −fx and −fy for the minus first-order diffracted beams 25c. Accordingly, the concentric elliptic groove type diffraction grating 201 provides the plus and minus first-order beams 25b and 25c with astigmatism (strong in the minor axis of and weak in the major axis of the ellipse) having the same absolute value in two directions, and projects those beams in the directions different from that of the zero-order beams 25a by positive and negative small angles.

When a concentric elliptic groove type diffraction grating 201 described with reference to FIGS. 12A and 12B is used, the diffraction greating 201 is arranged so that the Y-direction (minor axis of the ellipse 203) in FIGS. 12A and 12B is perpendicular to the plane of the paper of FIG. 1 and the X-direction (major axis of the ellipse 203) lies in the plane of the paper of FIG. 1.

Figure 7C:
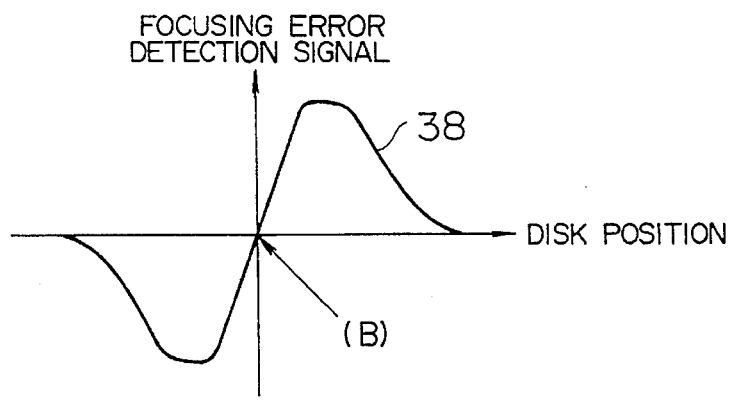
Figure 13A:
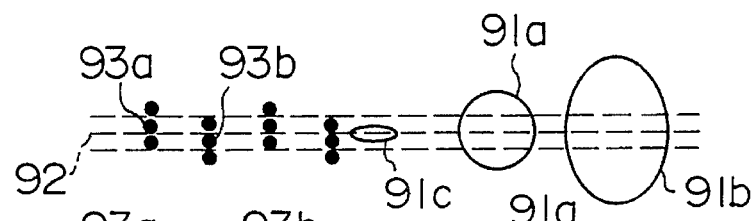
FIGS. 13A to 13E are partial plan views showing the relation between the diffraction grating shown in FIGS. 12A and 12B and light spots.
Figure 13B:
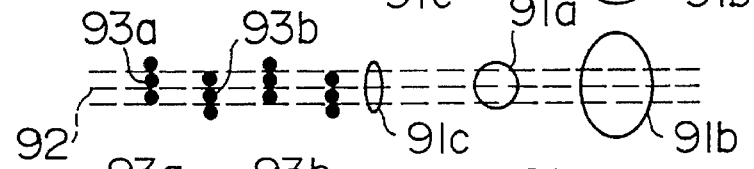
Figure 13C:
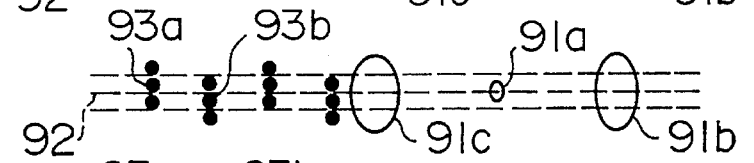
Figure 13D:
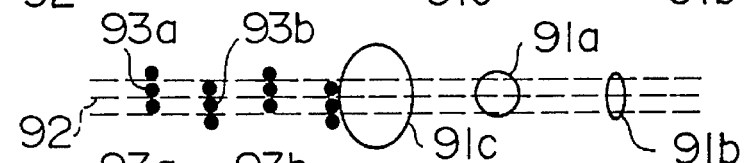
Figure 13E:
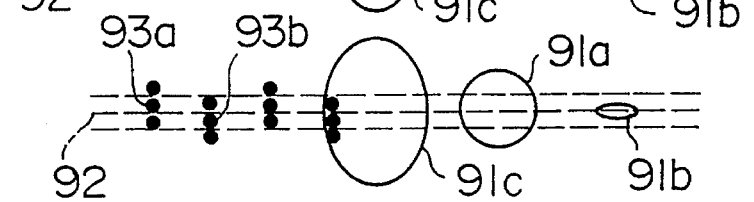
Figure 15A:
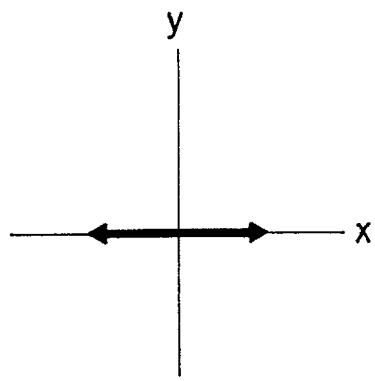
FIGS. 15A to 15E show the magneto-optical signal detection method according to the present invention.
Figure 15B:
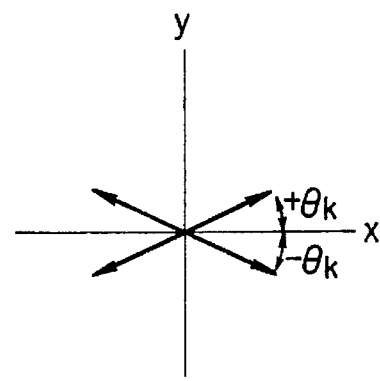
Figure 15C:
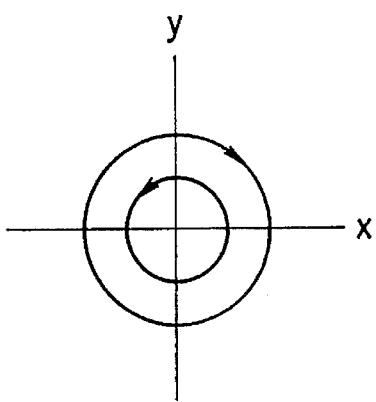
Figure 15D:
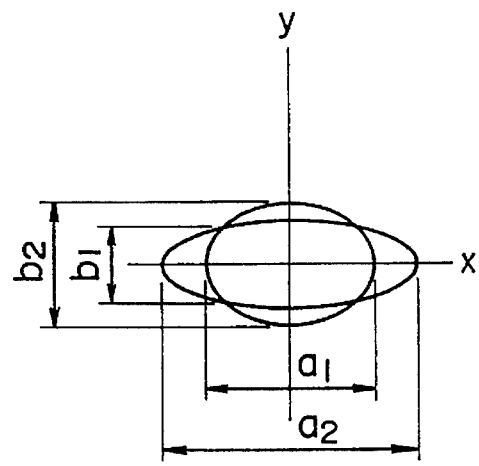
Figure 15E:
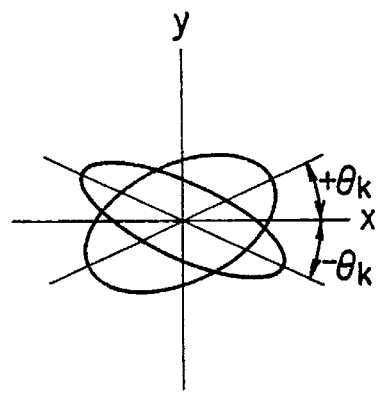

FIGS. 13A to 13E show the light spot 91a of the zero-order beam 25a, the light spot 91b of the plus first-order beam 25b, and the light spot 91c of the minus first-order beam 25c on the recording surface of the optical disk 30 as in FIGS. 6A to 6C when a concentric elliptic groove type diffraction grating 201 is used. The horizontal direction of the paper in FIGS. 13A to 13E corresponds to the X-direction (major axis of the ellipse 203) in FIGS. 12A and 12B, while the vertical direction in the plane of the paper corresponds to the Y-direction (minor direction of the ellipse 203) in FIGS. 12A and 12B. The pits 93a and 93b have the same function describe in FIG. 6. FIG. 13C shows the case where the optical disk 30 is located at the focus 29a of the zero-order beam 25a as in FIG. 6B. The light spot 91a is smallest, that is to say, the disk 30 is located at the position suitable for recording and reproducing information (target position for focusing). Because of the astigmatism given by the diffraction grating 201, which is strong in the vertical direction in the plane of the paper (Y-direction) and weak in the horizontal direction of the paper (X-direction), the converging positions of the plus and minus first-order beams 25b and 25c are greatly shifted in the vertical direction (Y-direction) in the plane of the paper and is slightly shifted in the horizontal direction (X-direction) of the paper. Therefore, those beams result in the elliptic spots 91a and 91b having the same size and being long in the vertical direction. Accordingly, the plus first-order reflected beam 31b and the minus first-order reflected beam 31c are modulated to the same degree by the pits 93a and 93b. FIG. 13B shows the case where as in FIG. 6A, the optical disk 30 is at the position of the focal line of the minus first-order beam 25c, which is formed in the X-direction. In this case, the minus first-order beams 25c are most greatly condensed in the horizontal direction, so that the spot 91c assumes a shape long in the vertical direction. The pits 93a and 93b are aligned for at least several tracks in the radial direction of the disk (vertical direction in the plane of the paper). Therefore, the minus first-order beams 25c are modulated to the greatest degree. On the other hand, the light spot 91b of the plus first-order beams 25b becomes larger than in FIG. 13C, so that the degree of modulation of the plus first-order reflected beams 31b is smaller than in FIG. 13C. FIG. 13A shows the case where the optical disk 30 is at the position of a focal line of the minus first-order beams 25c, which is formed in the Y-direction, much remoter from the focusing lens 28. In this case, the minus first-order beam 25c is now most greatly condensed in the vertical direction, so that the corresponding light spot 91c becomes long in the horizontal direction. Thus, the degree of modulation of the minus first-order reflected beam 25c is smaller than in FIG. 13B. The spot of the plus first-order beam 25c is must larger than in FIG. 13B, so that the degree of modulation of the plus first-order reflected beam 31b is smaller than in FIG. 13B. FIG. 13D shows the case in which the optical disk is at the position of a focal line of the plus first-order beam 25b, which is formed in the X-direction like in FIG. 6C. In this case, the plus first-order beams 25b are most greatly condensed in the horizontal direction, so that the corresponding spot 91c is long in the vertical direction. Since the pits 93a and 93b are aligned for at least several tracks in the radial direction of the disk (vertical direction in the plane of the paper), the plus first-order beams 25b are modulated to the greatest degree. On the other hand, the spot 91c of the minus first-order beam 25c is larger than in FIG. 13C, so that the degree of modulation of the minus first-order reflected beam 31c is smaller than in FIG. 13C. FIG. 13E shows the case where the optical disk 30 is closer to the focusing lens 28 and is located at the position of a focal line of the plus first-order beam 25, formed in the Y-direction, in this case, the plus first-order beams 25b are most greatly condensed in the vertical direction, so that the corresponding spot 91b is long in the horizontal direction. Thus, the degree of modulation of the plus first-order reflected beam 31b is smaller than in FIG. 13D. On the other hand, the spot 91c of the minus first-order beam 25c is larger than in FIG. 13D, so that the degree of modulation of the minus first-order reflected beam 31c is smaller than in FIG. 13D. Accordingly, when changes in the disk position are plotted on the axis of abscissa, the degrees of modulation of the light quantity signals 34b and 34c vary caused by the pits 93a and 93b as shown in the graph of FIG. 7A. To be more specific, the amplitude of the output signal 34b of the photo-detecting element 33b is maximum at the disk position (C), that of the output signal 34c from the photo-detecting element 33c is maximum at the disk position (A), and they are equal to each other at the disk position (B). Further, the modulation degree signals 36b and 36c produced by the envelope detecting circuits 35b and 35c are the same as in FIG. 7B. Accordingly, the focusing error detection signal indicated by the solid line 38 in FIG. 7C is provided by the differential operation circuit 37. If the optical disk 30 is located at the target position (B) for focusing, the focusing error detecting signal 38 automatically goes to zero level.

Suppose in this embodiment like the diffraction grating used in the first embodiment, the concentric elliptic groove type diffraction grating 201 has an effective area of 5 mm square and provides a diffraction angle of +0.745° for the plus and minus first-order beams. Further, assume in this embodiment that the focal distance fx is 3000 mm when the grating is used as a toroidal lens which operates in the X-direction (direction of the track 92 in FIGS. 13A to 13E) of the plus and minus first-order beams and the focal distance fy is 1500 mm when the grating is used as a toroidal lens which operates in the Y-direction (direction perpendicular to the track 92 in FIGS. 13A to 13E). Then, since a difference 6x in the optical axis direction between the positions of the focal lines of the plus and minus first-order beams converging in the X-direction and the focus position of the zero-order beam can be expressed by $$\delta y = f_o^2 / f y$$

Thus, $\delta x = 3$ μm is obtained, where the focal distance fo of the focusing lens is 3 mm as in the first embodiment. Therefore, the degrees of modulation of the plus and minus first-order beams at the target position (B) for focusing is about half the maximum degree of modulation at the positions of the focal lines (A) and (B) converging in the X-direction of the plus and minus first-order beams. As a result, the focusing error detection signal occurs in a curve as indicated by the solid line in FIG. 7C. Since a difference $\delta$ in the optical axis direction between the positions of the focal lines of the plus and minus first-order beams converging in the Y-direction and the focus position of the zero-order beams can be expressed by $$\delta y = f_o^2 / f y$$

Thus $\delta y = 6$ μm. The major axis radius RXn and the minor axis radius RYn of the ellipse 203n of the grating groove 202 can be calculated by the above-mentioned equation $$RXn = \sqrt{\{(fx + n\lambda)^2 - fx^2\}}$$

and the following equation $$RYn = \sqrt{\{(fy + n\lambda)^2 - fy^2\}}$$

Table 2 shows the values of RXn and RYn calculated in the range of 39.5 mm $\leq$ RXn $\leq$ 41.5 mm when the wavelength $\lambda = 0.00078$ mm (780 nm), the diffraction angle of the plus and minus first-order beams $\Theta = 0.745°$, and the grating size = 5 mm square. The $\Delta$RXn denotes a grating groove pitch, the value of which is 60.0 μm at the center of the diffraction grating, and decreases from 64.1 μm to 56.4 μm as the distance increases from the origin.

TABLE 2

| n | RXn (mm) | Xn (mm) | RYn (mm) |
|---|---|---|---|
| 368 | 41.50087 |  | 20.75043 |
|  |  | 0.05643 |  |
| 367 | 41.44444 |  | 20.72222 |
|  |  | 0.05650 |  |
| 366 | 41.38794 |  | 20.69397 |
|  |  | 0.05658 |  |
| 365 | 41.33136 |  | 20.66568 |
| . | . | . | . |
| . | . | . | . |
| 327 | 39.12065 |  | 19.56033 |
|  |  | 0.05987 |  |
| 326 | 39.06078 |  | 19.53039 |
|  |  | 0.05996 |  |
| 325 | 39.00082 |  | 19.50041 |
|  |  | 0.06005 |  |
| 324 | 38.94077 |  | 19.47039 |
|  |  | 0.06014 |  |
| 323 | 38.88063 |  | 19.44031 |
| . | . | . | . |
| . | . | . | . |
| 287 | 36.64983 |  | 18.32492 |
|  |  | 0.06391 |  |
| 386 | 36.58592 |  | 18.29296 |
|  |  | 0.06402 |  |
| 285 | 36.52190 |  | 18.26005 |
|  |  | 0.06413 |  |
| 284 | 36.45777 |  | 18.22889 |

A third embodiment of the present invention will next be described with reference to FIGS. 16 to 20.

Figure 16:
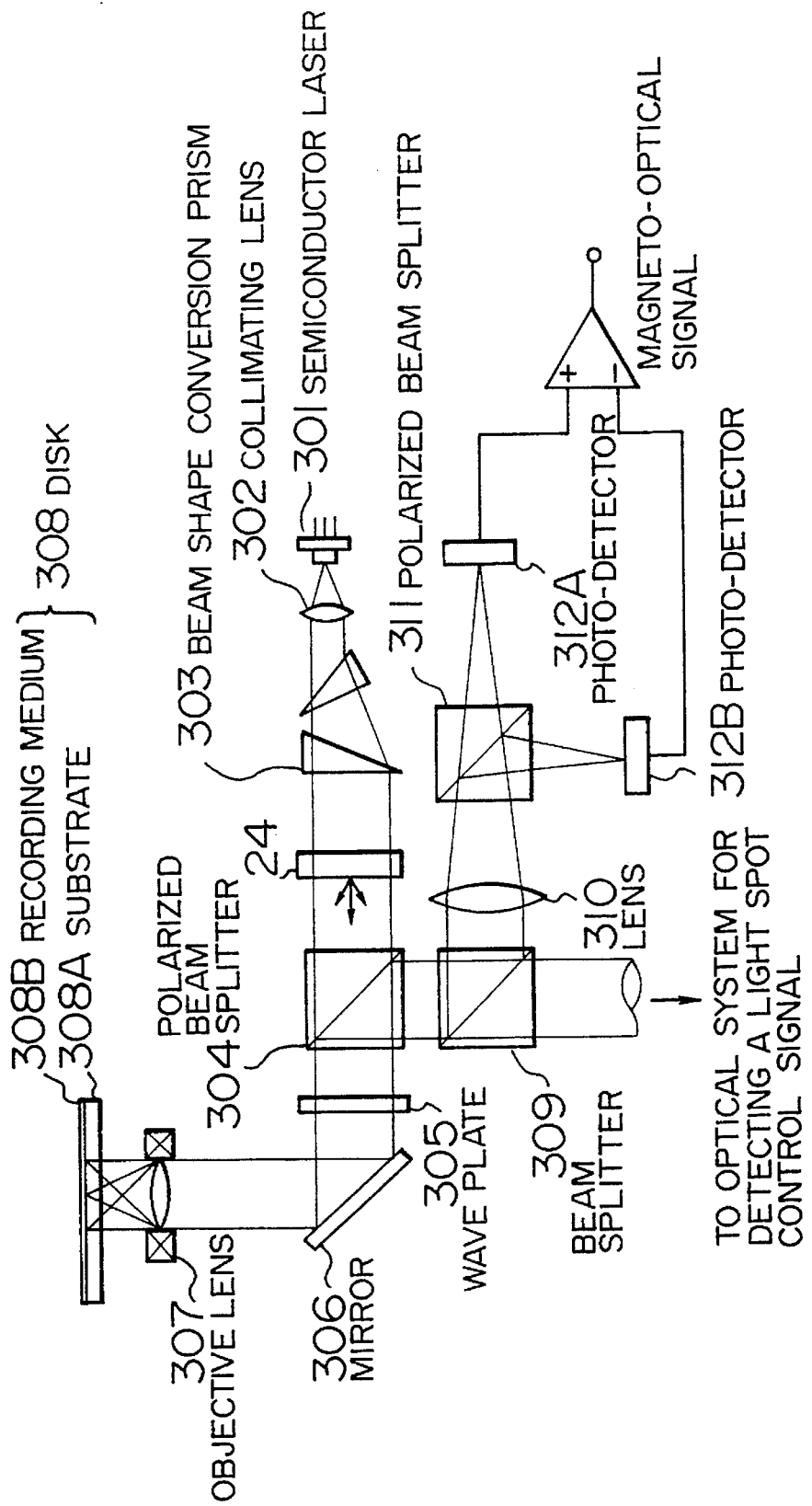
FIG. 16 shows an embodiment of the magneto-optical signal detection head according to the present invention.

FIG. 16 shows a case in which the present invention is applied to an optical head of a magneto-optical disk device.

An incident light (linearly polarized light) from a semiconductor light source 301 are made into a parallel luminous flux by a collimating lens 302, and after passing through a diffraction grating 24, the light intensity distribution of the parallel luminous flux is shaped into a circular form by a beam shape conversion prism system comprising two prisms. The beam shape conversion prism system may be formed by only one prism. The beam is made into an elliptically-polarized beam as it passes through a polarized beam splitter 304 and a wave plate 305. The elliptically-polarized beam passes through a mirror 306, and is focused on a disk 308 (substrate 308A, magneto-optical recording medium 308B) by an objective lens 307. The reflected beam from the disk 308 again is passed through the objective lens 307 and the wave plate 305, is reflected by the polarized beam splitter 304, and is separated by a focusing optical path and taken out. The reflected beam is split into two luminous fluxes, and one is projected into a magneto-optical signal detecting optical system for detecting a magneto-optical signal and the other is injected into a control signal detecting optical system for detecting light spot control signals such as a focusing error signal or an off-track signal.

The luminous flux injected into the magneto-optical signal detecting system passes through a lens 310, divided into two luminous fluxes by a polarized beam splitter 311, and one luminous flux is incident on a photo-detector 312A and the other luminous flux is incident on a photo-detector 312B. A polarized light splitter 311, which serves as an analyzer has its optical axis set at about an angle of 45° with respect to the polarized direction of the incident luminous flux. The magneto-optical signal is obtained as a differential output of the photo-detectors 312A and 312B. The magneto-optical recording medium 308B on the disk has magneto-optical characteristics including the Kerr ellipse rotation angle $\Theta k$ and the Kerr ellipticity $\epsilon k$. On the other hand, the wave plate 305 provides a phase difference $\delta$ and is set such that its optical axis is at an angle or $\gamma$ with respect to the polarized direction of the incident beam. The magneto-optical recording medium 308B receives the elliptically-polarized beam. The structure and function of the spot control signal detection focusing error system such as the focusing error detection optical system are the same as in FIG. 1 and will not be described here again.

Quantitative description will be made of the magneto-optical signal when a wave plate is inserted. Let us consider the optical system for detecting a magneto-optical signal as shown in FIG. 17.

The luminous flux from the semiconductor laser light source 301 passes through the polarized light splitter 304 and is made an elliptically-polarized beam by the wave plate 305, and is focused on the disk 308 by the objective lens 307. The reflected beam from the disk 308 passes again through the wave plate 305 and is reflected by the polarized beam splitter 304 and taken out. The reflected beam is divided into two luminous fluxes by an analyzed (the polarized beam splitter 311 in FIG. 16), injected into the photo-detectors 312A and 312B, and the difference between them is amplified and detected by a differential amplifier.

Figure 17:
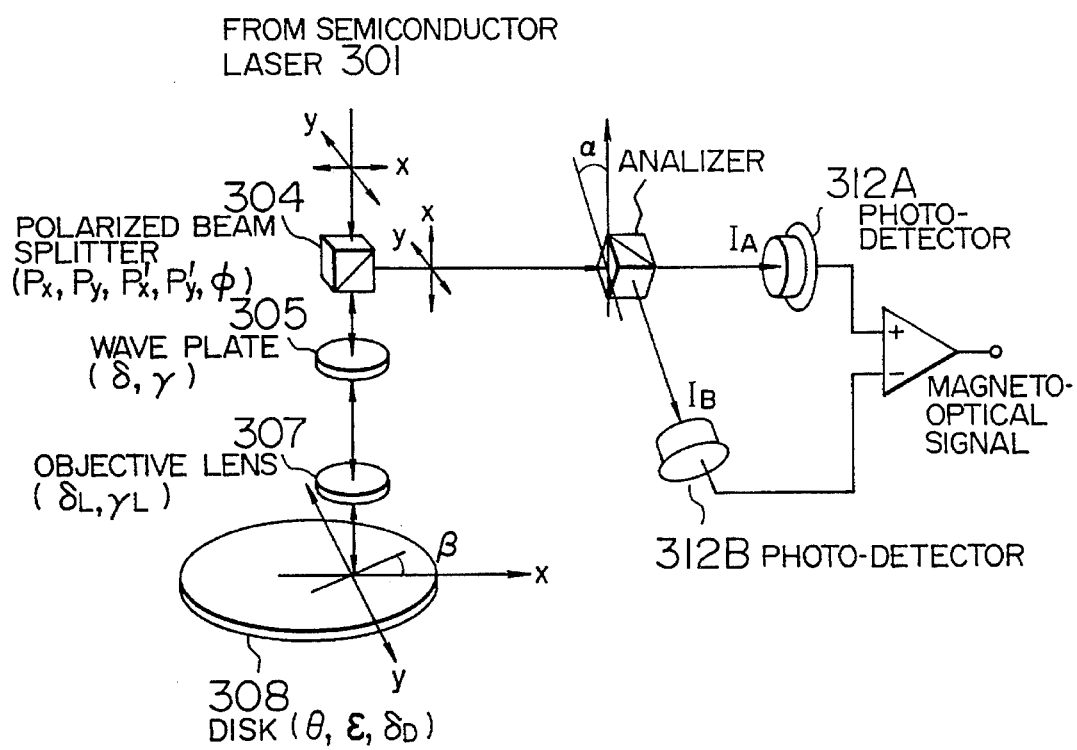
FIG. 17 is a schematic diagram showing the optical system of the magneto-optical signal detection head.

Coordinate systems for the optical parts at their separate positions are as shown in FIG. 17. Assume that the luminous flux from the semiconductor laser light source 301 is linearly polarized in the X-axis direction. The polarized beam splitter 304 has a transmittivity of 50% to 80% for p-polarized light (in the X-axis direction) and totally reflects s-polarized light (in the Y-axis direction).

The quantity of the magneto-optical signal is obtained here by differential detection using the Jones matrix.

If the intensities of beams incident on the photo-detectors 312A and 312B are denoted by $I_A^{\pm}$ and $I_B^{\pm}$, the magneto-optical differential signal S is expressed by $$|S| = |(I_A^+ - I_B^+) - (I_A^- - I_B^-)| \qquad (1)$$

(where "$\pm$" indicate the magnetization directions in the recorded domains). Assume here that the Jones matrices for the transmitted light and the reflected light of the polarized beam splitter 304, the wave plate 5, the objective lens 307, the disk 308, and analyzer (polarized beam splitter 311) are denoted respectively by L', L, WE, R, D, $P_A$ and $P_B$. If the Jones vector for the incident polarized light is denoted by $$\begin{pmatrix} 1 \\ 0 \end{pmatrix},$$

$I_A^{\pm}$ and $I_B^{\pm}$ are expressed as follows:

$$I_A^{\pm} = {}^t\left( P_A \cdot L \cdot W \cdot R \cdot D^{\pm} \cdot R \cdot W \cdot L' \cdot \begin{pmatrix} 1 \\ 0 \end{pmatrix} \right)^* \cdot \qquad (2)$$

$$\left( P_A^{\pm} \cdot L \cdot W \cdot R \cdot D^{\pm} \cdot R \cdot W \cdot L' \cdot \begin{pmatrix} 1 \\ 0 \end{pmatrix} \right)$$

$$I_B^{\pm} = {}^t\left( P_B \cdot L \cdot W \cdot R \cdot D^{\pm} \cdot R \cdot W \cdot L' \cdot \begin{pmatrix} 1 \\ 0 \end{pmatrix} \right)^* \cdot \qquad (3)$$

$$\left( P_B \cdot L \cdot W \cdot R \cdot D^{\pm} \cdot R \cdot W \cdot L' \cdot \begin{pmatrix} 1 \\ 0 \end{pmatrix} \right)$$

$$1_A^{\pm} = (10) \cdot {}^tL^* \cdot {}^tW^* \cdot {}^tR^* \cdot {}^tD^{\pm^*} \cdot {}^tR^* \cdot {}^tW^* \cdot {}^tL^* \cdot {}^tP_A^* \cdot \qquad (4)$$

$$P_A \cdot L \cdot W \cdot R \cdot D^{\pm} \cdot R \cdot W \cdot L' \cdot \begin{pmatrix} 1 \\ 0 \end{pmatrix}$$

$$I_B^{\pm} = (10) \cdot {}^tL^* \cdot {}^tW^* \cdot {}^tR^* \cdot {}^tD^{\pm^*} \cdot {}^tR^* \cdot {}^tW^* \cdot {}^tL^* \cdot {}^tP_B^* \cdot \qquad (5)$$

$$P_B \cdot L \cdot W \cdot R \cdot D^{\pm} \cdot R \cdot W \cdot L' \cdot \begin{pmatrix} 1 \\ 0 \end{pmatrix}$$

From the above, we obtain:

$$I_A^+ - I_B^+ = (10) \cdot {}^tL^* \cdot {}^tW^* \cdot {}^tR^* \cdot {}^tD^{+^*} \cdot {}^tR^* \cdot {}^tW^* \cdot {}^tL^* \qquad (6)$$

$$({}^tP_A^* P_A - {}^tP_B^* P_B) \cdot L \cdot W \cdot R \cdot D^+ \cdot R \cdot W \cdot L \cdot \begin{pmatrix} 1 \\ 0 \end{pmatrix}$$

$$I_A^- - I_B^- = (10) \cdot {}^tL^* \cdot {}^tW^* \cdot {}^tR^* \cdot {}^tD^{-^*} \cdot {}^tR^* \cdot {}^tW^* \cdot {}^tL^* \qquad (7)$$

$$({}^tP_A^* P_A - {}^tP_B^* P_B) \cdot L \cdot W \cdot R \cdot D^- \cdot R \cdot W \cdot L \cdot \begin{pmatrix} 1 \\ 0 \end{pmatrix}$$

Therefore, the magneto-optical signal can be expressed as:

$$|S| = (10) \cdot {}^tL^* \cdot {}^tW^* \cdot {}^tR^* \cdot \qquad (8)$$

$$({}^tD^* \cdot {}^tR^* \cdot {}^tW^* \cdot {}^tL^* ({}^tP_A^* P_A - {}^tP_B^* P_B) \cdot$$

$$L \cdot W \cdot R \cdot D^+ - {}^tD^* \cdot {}^tR^* \cdot {}^tW^* \cdot {}^tL^* ({}^tP_A^* P_A - {}^tP_B^* P_B) \cdot$$

$$L \cdot W \cdot R \cdot D^-) \cdot R \cdot W \cdot L \cdot \begin{pmatrix} 1 \\ 0 \end{pmatrix}$$

The respective Jones matrices at this time are as shown in (a) to (g):

$$(a) L' = \begin{pmatrix} P'x & 0 \\ & & i\phi \\ 0 & P'ye \end{pmatrix} \qquad (9)$$

where P'x and P'y denote the transmittivites of the polarized lights in the X- and the Y-directions, and φ denotes the phase difference of the polarized beam splitter.

$$(b) L' = \begin{pmatrix} Px & 0 \\ 0 & Pye^{i\phi} \end{pmatrix} \quad (10)$$

where Px and Py denote the reflectivities of the polarized lights in the X- and Y-directions, and the φ denotes the phase difference of the polarized beam splitter.

$$(c) W = \begin{pmatrix} \cos\frac{\delta}{2} - i\sin\frac{\delta}{2}\cos 2\gamma & -i\sin\frac{\delta}{2}\sin 2\gamma \\ -i\sin\frac{\delta}{2}\sin 2\gamma & \cos\frac{\delta}{2} + i\sin\frac{\delta}{2}\cos 2\gamma \end{pmatrix} \quad (11)$$

where δ denotes a phase difference produced by the wave plate, and γ denotes an angle between the optical axis of the wave plate and the optical system axis.

$$(d) R = \begin{pmatrix} \cos\frac{\delta_L}{2} - i\sin\frac{\delta_L}{2}\cos 2\gamma_L & -i\sin\frac{\delta_L}{2}\sin 2\gamma_L \\ -i\sin\frac{\delta_L}{2}\sin 2\gamma_L & \cos\frac{\delta_L}{2} + i\sin\frac{\delta_L}{2}\cos 2\gamma_L \end{pmatrix} \quad (12)$$

where $\delta_L$ denotes the phase difference by the wave plate and $\gamma_L$ denotes an angle between the optical axis of the lens and the incident polarized beam.

$$(e) D = \begin{pmatrix} \{e^{i\delta_D} + 2i\sin^2\beta\sin\delta_D\}\cos\{\pm(\theta+i\epsilon)\} \\ -i\sin\delta_D\cos\{\pm(\theta+i\epsilon)\}\sin 2\beta + \sin\{\pm(\theta+i\epsilon)\} \\ -i\sin\delta_D\cos\{\pm(\theta+i\epsilon)\}\sin 2\beta - \sin\{\pm(\theta+i\epsilon)\} \\ \{e^{i\delta_b} + 2i\sin^2\beta\sin\delta_D\}\cos\{\pm(\theta+i\epsilon)\} \end{pmatrix}$$

where $\delta_D$ denotes the phase difference by the disk substrate, β denotes an angle between the disk optical axis and the optical system axis, Θ denotes an angle at which the incident polarized light is rotated by the recording film, and +Θ is taken for the counter-clockwise circular-polarized light. As for the ordinary Kerr rotation angle, the rotation of a clockwise circular-polarized light is regarded as positive.

$$\Theta_k = -\Theta \quad (14)$$

The ε denotes the absorption coefficient of circularly-polarized light, so that $e^{-\epsilon}$ for counter-clockwise circular-polarized light, and $e^{+\epsilon}$ for clockwise circular-polarized light.

Therefore, assuming that clockwise circular-polarized light is positive, the relation with the Kerr ellipticity $\epsilon_k$ is $$\tan\epsilon_k = \frac{e^{\epsilon} - e^{-\epsilon}}{e^{\epsilon} - e^{-\epsilon}} = \tanh\epsilon \quad (15)$$

If ε and $\epsilon_k$ are sufficiently small, $$\epsilon_k \approx \epsilon \quad (16)$$

$$(f)\ P_A = \frac{1}{2}\begin{pmatrix} 1+\cos 2\alpha & \sin 2\alpha \\ \sin\alpha & 1-\cos 2\alpha \end{pmatrix} \quad (17)$$

$$(g)\ P_B = \frac{1}{2}\begin{pmatrix} 1-\cos 2\alpha & -\sin 2\alpha \\ -\sin 2\alpha & 1+\cos 2\alpha \end{pmatrix} \quad (18)$$

where α is an angle between the analyzer optical axis and the optical systmm axis.

Therefore, by calculating the equation (8) using the Jones matrices (9) to (18), the magneto-optical signal amount |S| can be obtained. Assuming here that the phase differences by the polarized light splitter, the objective lens, and the disk substrate is sufficiently small, we have:

$$\phi=0,\ \delta_L=0,\ \delta_D=0 \quad (19)$$

Further, by setting the analyzer at 45° with respect to the optical system axis as follows, $$\alpha=45° \quad (20)$$

the magneto-optical signal amount |S| is expressed as $$|S|=2(Px')^2 PxPy$$
$$\times [\sin 2\Theta_k \cos\delta + \sin h2\epsilon_k \cos 2_8 \sin\delta] \quad (21)$$

The equation (21) can be transformed into $$|S| = 2\,(Px')^2\,PxPy \times \sqrt{\sin^2 2\theta_k + (\sinh 2\epsilon_k \cdot \cos 2\gamma)^2}\ \sin(\delta+\phi) \quad (22)$$

$$\text{where } \tan\phi = \frac{2\theta_k}{\sinh 2\epsilon_k \cdot \cos 2\gamma} \quad (23)$$

The $\Theta_k$ and $\epsilon_k$ are intrinsic values of the magneto-optical recording medium, so they are constants in the equations (22) and (23).

In the equation (22), the first term in $\sqrt{\phantom{--}}$ corresponds to the rotation of the polarization direction by the Kerr effect and the second term corresponds to changes in the ellipticity by the optical dichroism.

Incidentally, in most of the conventional magneto-optical disk devices, the rotation of the polarization direction by the Kerr effect is detected by the so-called differential detection method. In this case, linearly-polarized light is incident on the recording medium. Unlike the present invention in which a wave plate is used to produce elliptically-polarized light for irradiation, δ=0 in the equation (21). Therefore, $$|S|=2(Px')^2 P_x P_y \sin 2\Theta_k \quad (24)$$

By the above equation, the signal component corresponding to the Kerr rotation angle $\Theta_k$ can be obtained, but the optical dichroism cannot be detected.

In the magneto-optical signal detection method using the optical dichroism, to let elliptically-polarized light be incident on the recording medium, a ¼ wave plate (δ=90°) is used and set such that its optical axis is at about 45° with respect to the polarization direction of the incident light (γ=45°). When the optical dichroism is used, the total light quantity of the reflected light is detected, so that the magneto-optical signal |S'| is $$|S'| = |(I_A^+ + I_B^+) - (I_A^- + I_B^-)| \quad (25)$$
$$= 2(Px')^2(Py)^2 \sin\delta \sin 2\gamma \sinh 2\epsilon_k$$

If linearly-polarized light is emitted to the recording medium without using the wave plate, δ=0, and therefore, S'=0, so that the magneto-optical signal cannot be detected. On the other hand, when circularly-polarized light is used, because δ=90° and δ=45°, $$|S'|=2(P'x)^2(Py)^2 \sin h2\epsilon_k \quad (26)$$

Thus, the magneto-optical signal by the optical dichroism can be detected, but the Kerr effect is not included.

When circularly-polarized light is emitted, if the differential detection as in the present invention is used, from the equation (21), $$|S|=0$$

Thus, the magneto-optical signal cannot be reproduced.

However, by emitting elliptically-polarized light produced by the wave plate onto the recording medium and the reflected light is detected by the differential detection method, it is possible to detect the magneto-optical signal by utilizing the Kerr effect and the optical dichroism. If the type of magneto-optical recording medium is decided from the equation (22), by setting predetermined values for the phase difference $\delta$ and setting angle $\gamma$ of a wave plate inserted into a converged luminous flux in such a way as to meet $$\sin(\delta+\phi) \approx 1 \tag{27}$$

the magneto-optical signal amount $|S|$ can be maximized.

If the wave plate is not used and linearly-polarized light is emitted, $\delta=0$, and as mentioned above, the equation (21) becomes $$|S|=2(Px')^2 PxPy \cdot \sin 2_k\Theta \tag{28}$$

If the equation (22) is compared with the equation (28), $$(\sin h 2\epsilon_k \cdot \cos 2\gamma)^2 > 0 \tag{29}$$

Therefore, the following equation holds:

$$\sqrt{\sin^2 2\theta_k + (\sinh 2\epsilon_k \cdot \cos 2\gamma)^2} > \sin 2\theta_k \tag{30}$$

From the above, it is understood that by using the wave plate to emit elliptically-polarized light onto the magneto-optical recording medium, the magneto-optical signal amount increases. When the equation (27) is satisfied, the maximum value of the equation (22) is given by $\delta=0$, and we have $$|S| = 2(Px') PxPy \cdot \sqrt{\sin^2 2\theta_k + \sinh^2 2\epsilon_k} \tag{31}$$

The above description is concerned with the effect of increase in the magneto-optical signal component. However, by setting adequate values for $\delta$ and $\gamma$, noise due to the light fed back to the laser can be suppressed without decreasing the magneto-optical signal component. The reason is described below. Let us consider a case when in the equation (21), the value in [ ] is that which is obtained when the wave plate is not inserted and linearly-polraized light is emitted ($\delta=0$ and only the Kerr effect is detected). In this case, the equation (21) can be set as:

$$[\sin 2\Theta_k \cos \delta + \sin h2\epsilon_k \cos 2\gamma \sin \delta] = \sin 2\Theta_k \tag{32}$$

and, we obtain $$\cos 2\gamma = \frac{\sin 2\theta_k(k-\cos\delta)}{\sinh 2\epsilon_k \sin\delta} \tag{33}$$

Therefore, if $\delta$ and $\gamma$ satisfy the equation (33), the magneto-optical signal component equivalent to that which is obtained by detecting only the Kerr effect by irradiation of linearly-polarized light can be obtained.

Description will now be made of the optical feedback to the semiconductor laser. As with the magneo-optical signal component, the Jones matrix is used to clarify the state of polarization of the optical feedback to the semiconductor laser. The optical feedback light quality Io can be expressed as follows.

$$Io = {}^t\left(L' \cdot W \cdot R \cdot D^{\pm} \cdot R \cdot W \cdot L' \cdot \begin{pmatrix} 1 \\ 0 \end{pmatrix}\right)^* \cdot \tag{34}$$

$$\left(L' \cdot W \cdot R \cdot D^{\pm} \cdot R \cdot W \cdot L' \cdot \begin{pmatrix} 1 \\ 0 \end{pmatrix}\right)$$

$$= (10)\, {}^tL'^* \cdot {}^tW^* \cdot {}^tR^* \cdot {}^tD^{\pm *} \cdot {}^tR^* \cdot {}^tW^* \cdot {}^tL'^* \cdot$$

$$L' \cdot W \cdot R \cdot D^{\pm} \cdot R \cdot W \cdot L' \cdot \begin{pmatrix} 1 \\ 0 \end{pmatrix}$$

Now, matrix calculation is performed using the equations (9) to (16). As with the magneto-optical signal component, the phase differences by the polarized beam splitter, the objective lens, and the disk substrate are assumed to be sufficiently small, and are set as:

$$\phi=0, \delta_L=0, \delta_D=0$$

Further, because the influence of the magneto-optical signal on the optical feedback quantity is considered to be sufficiently small, it is possible to set $$\Theta_k \approx 0, \epsilon_k \approx 0$$

From the foregoing conditions, Io can be calculated as $$Io=(Px')^4(1-\sin^2\delta \sin^2 2\gamma y) +(Px')^2(Py')^2 \sin^2\delta \sin^2 2\gamma \tag{35}$$

Let us consider Px' and Py'. Because the light incident on the polarized beam splitter 304 is linearly polarized in the X-axis direction, the incident light is a p-polarized light for the polarized beam splitter. The magneto-optical signal component turns out as an s-polarized light component. In this system, Px' is the transmittivity of the p-polarized light component, while Py' is the transmittivity of the s-polarized light component. However, Py'=0 is set. Therefore, the second term is removed from the equation (35) as shown below:

$$Io=(Px')^4(1-\sin^2\delta \sin^2 2\gamma) \tag{36}$$

The equation (36) indicates that by inserting the wave plate, the optical feedback can be suppressed.

In summary, when elliptically-polarized light is emitted to the magneto-optical recording medium by the optical head for detecting a magneto-optical signal (for example, when a wave plate for producing a phase difference $\delta$ is inserted in the focusing optical path), the magneto-optical signal component $|S|$ obtained by the differential detection method is $$|S|=2(Px')^2 PxPy \times [\sin 2\Theta_k \cos \delta + \sin h2\epsilon_k \cos 2\gamma \sin \delta] \tag{21}$$

Therefore, it is possible to detect both the polarization axis rotation of elliptically-polarized light (Kerr effect) and changes of ellipticity (optical dichroism), so that the magneto-optical signal amount can be increased.

On the other hand, the semiconductor laser feedback light quantity Io is expressed as $$Io=(Px')^4(1-\sin^2\delta \sin^2 2\gamma) \tag{36}$$

This equation (36) indicates that since elliptically polarized light is emitted to the magneto-optical recording medium, if the wave plate for producing a phase difference $\delta$ is inserted in the focusing optical path, the light quantity fed back to the semi-conductor laser is decreased. A result derived from the equation (21) is that if $\delta$ and $\gamma$ are set to satisfy the following relation $$\cos 2\gamma = \frac{\sin 2\theta_k(1-\cos\delta)}{\sinh 2\epsilon_k \sin\delta} \qquad (33)$$

then, the magneto-optical signal component which is equivalent to or more than that which is obtained by detecting only the Kerr effect by irradiation of linearly-polarized light can be obtained, and the laser noise by the optical feedback can be reduced without decreasing the magneto-optical signal component.

In the optical head for detecting a magneto-optical signal, in order to emit elliptically-polarized light on the magneto-optical recording medium, it is only necessary to insert a wave plate for producing a phase difference $\delta(0<\delta-\pi m<90°$ where m is 0 or a positive integer). Changes made in the arrangement of the optical head can be said to be very small compared with the arrangement of the conventional optical head. In spite of the minor changes, the notable result is that since the differential detection method is adopted, the polarization axis rotation of elliptically-polarized light (Kerr effect) and changes in the ellipticity (optical dichroism) can be detected, so that the magneto-optical signal component can be increased.

By setting predetermined values for the phase difference $\delta$ and the setting angle $\gamma$ of the wave plate, the magneto-optical signal component is obtained which is equivalent to or more than that is obtainable by detecting only the Kerr effect by irradiation of linearly-polarized light. Simultaneously with this operation, the laser noise caused by the optical feedback can be reduced.

Decreasing the light quantity fed back to the laser light source means to increase the light quantity incident on the signal detecting system. Therefore, the light quantity incident on the focusing error detection optical system described with reference to the first embodiment of the present invention increases, so that the focusing error detection signal can be detected in more stable manner.

As described earlier, the magneto-optical signal amount $|S|$ by differential output of the photo-detectors 312A and 312B are expressed by the equations (21) and (22). By the magneto-optical signal, it is possible to detect both the polarization axis rotation of elliptically-polarized light (Kerr effect, $\Theta_k$) and the changes in the ellipticity (optical dichroism, $\epsilon_k$). From the equations (22) and (23), by setting $\gamma=0$, $$\sin(\delta+\phi)\approx 1$$

If the phase difference $\delta$ of the wave plate 305 to satisfy the following relation $$\tan\phi = \frac{2\theta_k}{\sinh 2\epsilon_k \cdot \cos 2\gamma}$$

$$= \frac{2\theta_k}{\sinh 2\epsilon_k} \quad (\gamma=0)$$

then, the magneto-optical signal can be maximized as shown in the equation (31).

According to the proceedings of Magnetics Seminar of the Institute of Electrical Engineers of Japan, MAG-89-230 pp. 35–42 (1989), a magneto-optical recording medium can be realized which meets the following conditions:

$$\Theta_k=1°, \epsilon_k=3.5°$$

Figure 18:
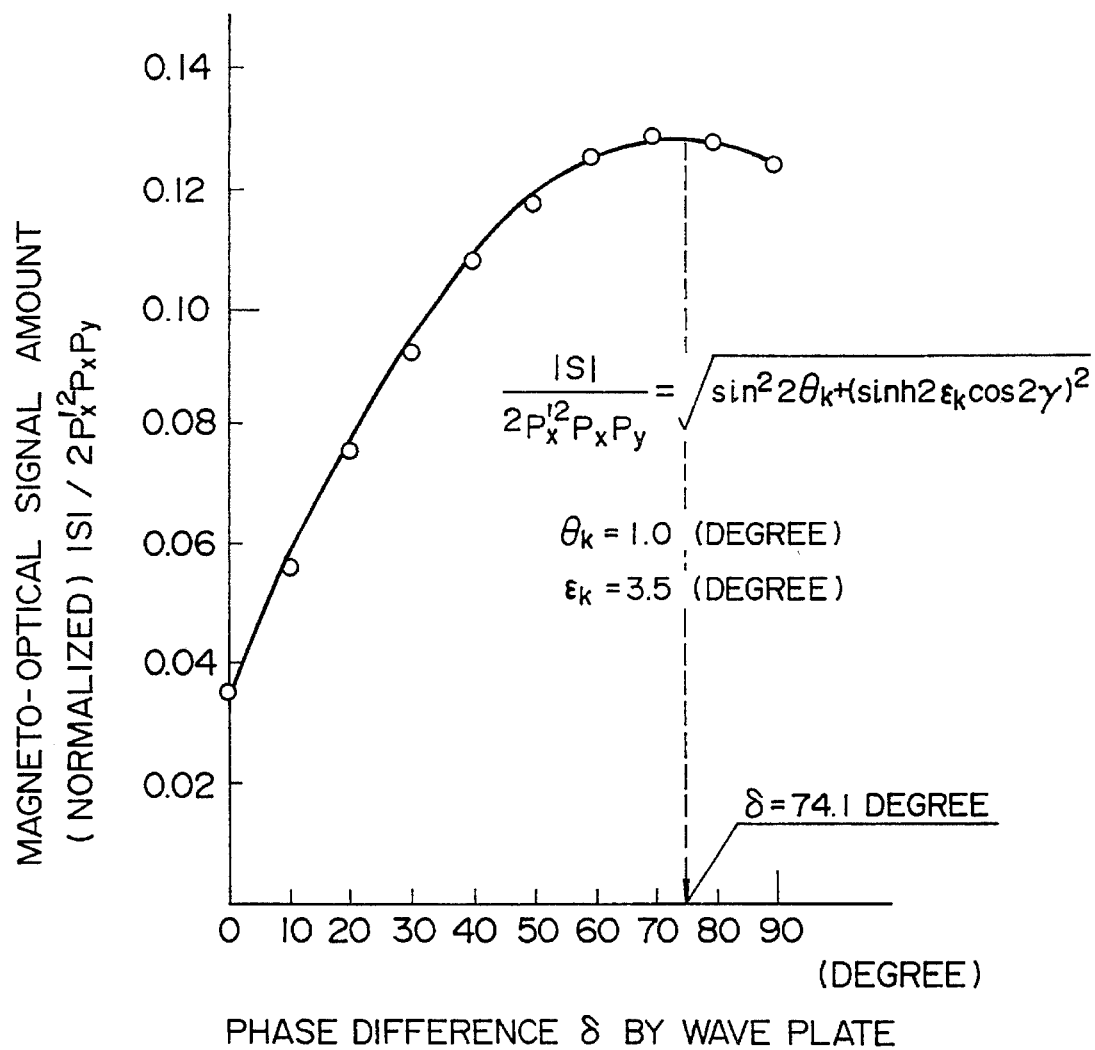
FIG. 18 is a diagram showing the effect of the optical system of FIG. 17.

FIG. 18 shows the result of calculation of the magneto-optical signal amount $|S|$ calculated by the equations (22) and (23) using the above values. In FIG. 18, $|S|$ is expressed in the normalized form:

$$|S|/2(Px')^2 PxPy$$

From the equation (23), $$\phi=15.9°$$

Therefore, to satisfy the equation (27), if the range of $\delta$ is set as $$0<\delta<180°$$

then, $$\delta=74.1°$$

The normalized magneto-optical signal at this time is $$|S|/2(Px')PxPy=0.127$$

From the above, it is understood that it is possible to increase the $|S|$ about three times as large as the value of 0.035 obtained when the wave plate is not inserted and linearly-polarized light is emitted ($\delta=0$). Since it is considered possible that there is some variation in the value the phase difference and the angle setting accuracy in an actual optical head, the equation (27) need not necessarily be strictly satisfied.

As is clear from FIG. 18, so long as the displacement of the phase difference with respect to a target value is no more than several degrees, substantial effects of the present invention can be said to be obtainable.

Figure 19:
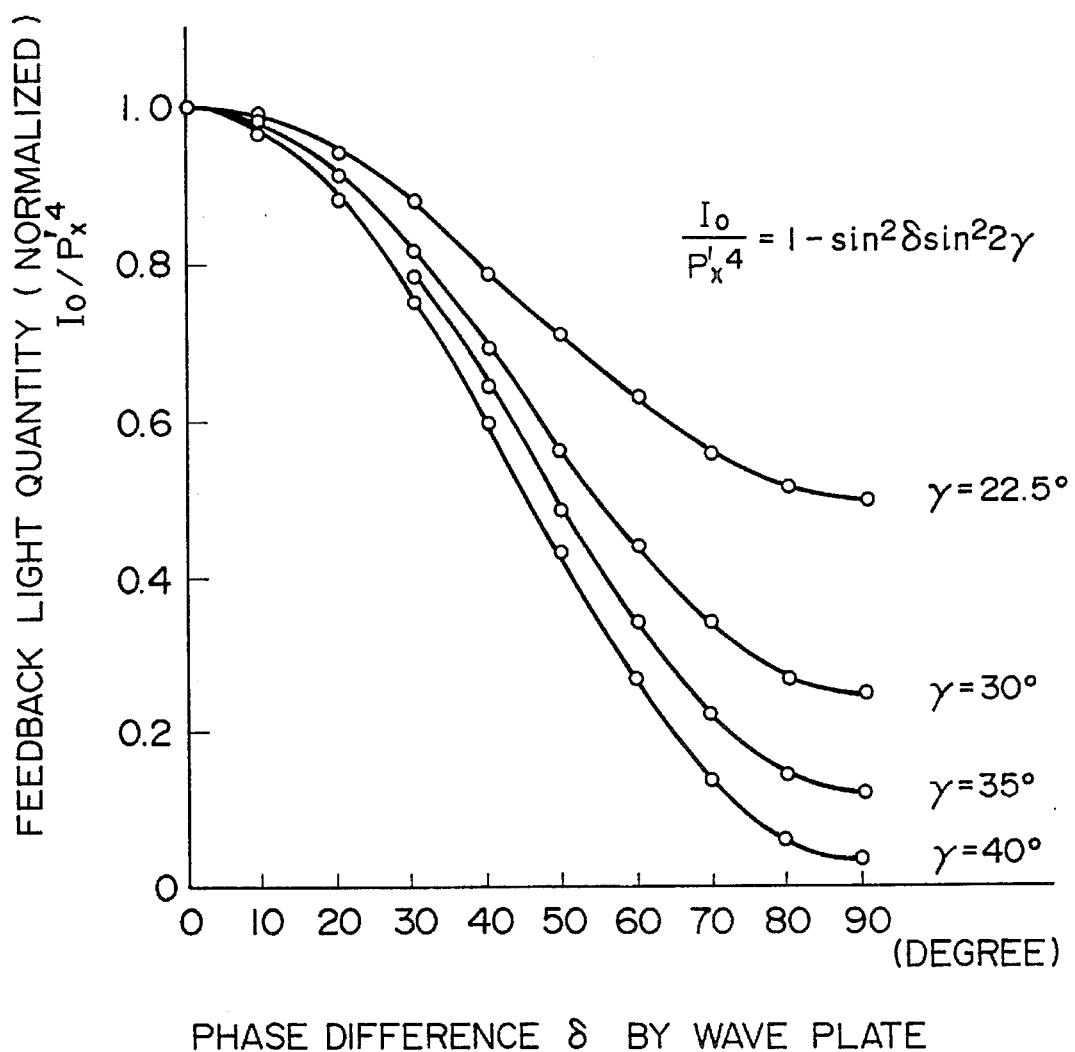
FIG. 19 is a diagram showing the effect of the optical system of FIG. 17.

The calculation result of the equation (36) in FIG. 19 is shown below. In FIG. 19 the light intensity fed back to the semiconductor laser is shown normalized as $$Io/(Px')^4$$

In view of the occurrence of laser noise, it is necessary to reduce the feedback light intensity to less than one-half or preferably one-fourth. To this end, the values of the phase difference $\delta$ and the setting angle $\gamma$ should be in the following ranges where m is 0 or a positive integer.

$$45°<(\delta-2\pi m)<90°$$

$$22.5°<(\gamma-2\pi m)<45°$$

more preferably $$60°<(\delta-2\pi m)<90°$$

$$30°<(\delta-2\pi m)<45°$$

Figure 20:
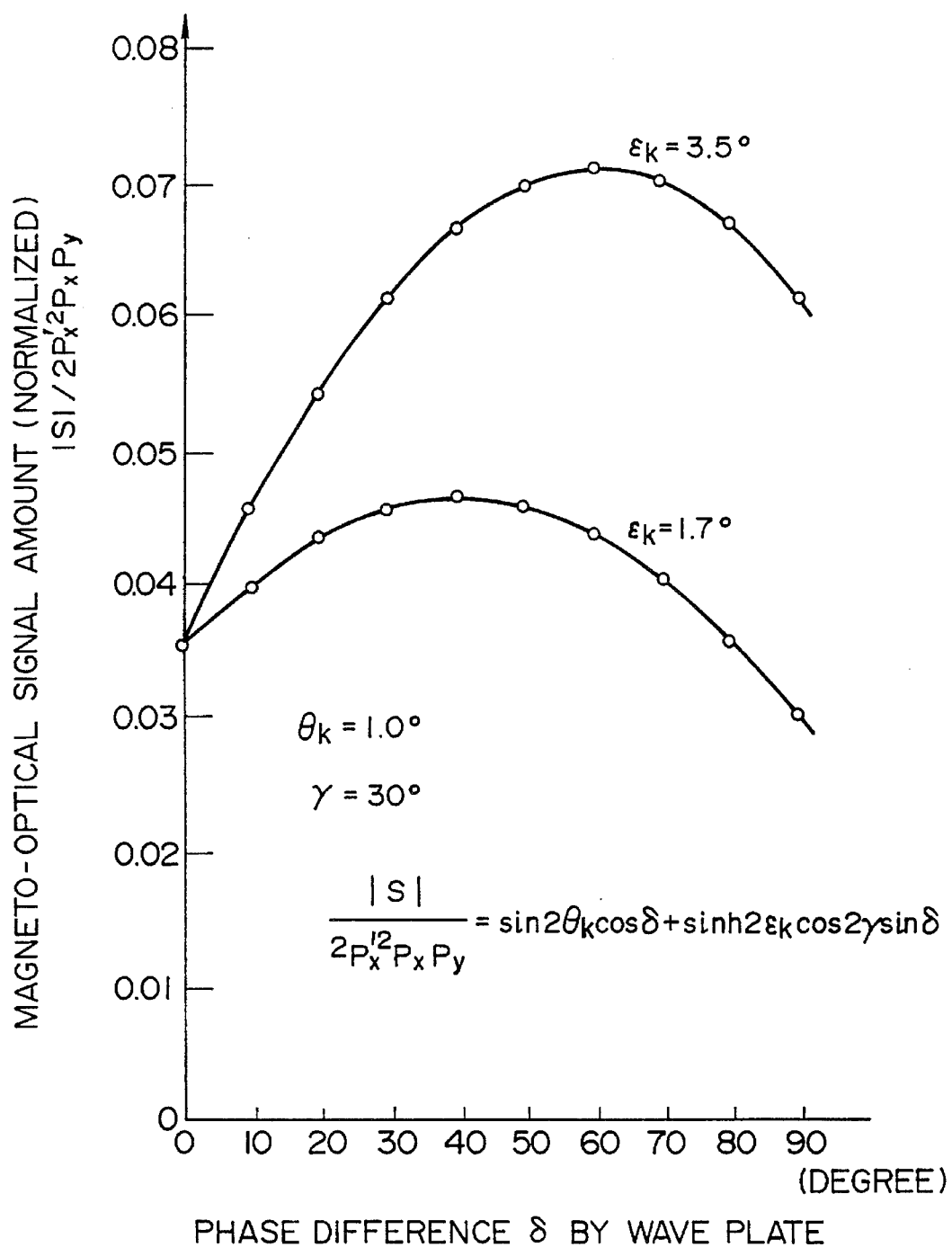
FIG. 20 is a diagram showing the effect of the optical system of FIG. 17.

As mentioned above, using a magneto-optical recording medium with the following conditions $$\Theta_k=1°, \epsilon_k=3.5°$$

the magneto-optical signal amount was calculated by the equations (22) and (23), the result of which is shown in FIG. 20 ($\gamma=30°$). In FIG. 20, $|S|$ is shown normalized by $$|S|2(Px')^2 PxPy$$

The magneto-optical signal amount $|S|/2(Px')^2 PxPy$ is maximum when $$\delta=60°$$

The signal amount obtainable is about twice as much as that when linearly-polarized light is emitted ($\delta=0$). From FIG. 19, the feedback light quantity at this time is $$Io/(Px')^4\approx 0.43$$

It is understood that the signal amount is about ⅔ of that when linearly-polarized light is emitted without using the wave plate (δ=0). On the other hand, the feedback light quantity is minimum when $$\delta = 90°$$

and its value is $$Io/(Px')^4 \approx 0.25$$

Even in this case, the magneto-optical signal more than 1.5 times as much as when the wave plate is not used and linearly-polarized light is emitted. In this case, the δ which satisfies the relation of the equation (33) exists in the range of 90°<δ<180°. However, this range, in which the feedback light quantity increases, is not practical.

FIG. 20 also shows a case in which the Kerr ellipticity angle $\epsilon_k = 1.7°$. In this case, the magneto-optical signal amount is maximum when $$\delta \approx 40°$$

and the signal amount is about 1.3 times as much as when the wave plate is not used and linearly-polarized light is emitted. However, the feedback light quantity is $$Io/(Px')^4 \approx 0.69$$

Thus, the effect of reducing the feedback light quantity is small. However, in this case, the phase difference δ which satisfies the relation of the equation (33) is $$\delta \approx 81°$$

and the feedback light quantity under this condition is $$Io/(Px')^4 0.26$$

Therefore, the magneto-optical signal component is obtained which is equivalent to the signal component obtainable by detecting only the Kerr effect by setting the above-mentioned value for the phase difference δ to emit linear-polarized light without using the wave plate, and simultaneously the feedback light quantity is reduced to about ¼, so that the laser noise can be reduced.

Description has been made of the cases in which the phase difference δ and the setting angle γ when the feedback light quantity is minimum or when the magneto-optical signal component is equivalent to that when the wave plate is not used. However, the phase difference δ and the setting angle γ may be set between the condition under which the magneto-optical signal component can be maximized and the condition under which the feedback light quantity can be minimized. Or, they may be set between the condition under which the magneto-optical signal component is equivalent to or more than the signal component obtainable when the wave plate is not used and the condition under which the feedback light quantity is minimized.

In an actual optical head, there is likely to be some variation in the value of the phase difference δ and the setting accuracy of the setting angle γ, and therefore, the equations concerned need not necessarily be satisfied strictly. If the displacement of the phase difference δ from the target value is some several degrees, the substantial effect of the present invention can be said to be obtainable.

With the Kerr ellipticity angle $\epsilon_k$ of about 0.5° to 0.6° the present invention provides some effect, but the Kerr ellipticity angle of 1.0° or more is preferable because a greater effect can be obtained.

For simplicity, in the foregoing description, no consideration is not given to the phase differences produced by the disk substrate 308A, the mirror 306, the beam splitter 309, and the lens 310. Since their phase differences are considered sufficiently small in an actual system, the influence of the above-mentioned results is small.

In this embodiment, the polarized beam splitter 311 is turned and installed as an analyzer as motioned above. However, it is possible to provide a ½ wave plate in front of the polarized beam splitter and turn the polarization direction of light incident on the polarized beam splitter 311 by 45°. It is possible to make such an arrangement that a single optical system is provided which functions both for light spot control signal detection and for magneto-optical signal detection without providing separate systems and both the magneto-optical signal and the light-spot control signal are detected from the same luminous flux. This arrangement has no influence on the effect of the wave plate.

According to the present invention, it is possible to achieve a focusing error detection method and an optical head using this method, which do not require or require very minor positional adjustment of the optical components for focusing, and which can self-adjust the target for focusing without causing offset in the focusing error detection signal even if the optical components are shifted from the originally mounted positions. It is also possible to achieve a focusing error detection method which can be sufficiently applied to waveguide optical heads. Further, even when off-track occurs, the pull-in motion for automatic focusing control can be performed stably. An optical head can be obtained, which is combined with tracking control with the sampled servo system using an optical disk formatted for the sampled servo system and which is therefore capable of adjustment-free operation since the optical head requires substantially no adjustment of the optical components.

According to the present invention, elliptically-polarized light is emitted onto a magneto-optical recording medium, the reflected light is bisected for differential detection, whereby both the polarization axis rotation (Kerr) effect and the ellipticity change (optical dichroism) of the elliptically-polarized light are detected to thereby increase the magneto-optical signal component.

To emit elliptically-polarized light onto the magneto-optical recording medium, it is only necessary to insert a wave plate in the focusing optical path of the optical head for magneto-optical signal detection. The magneto-optical signal amount can be increased only by setting values predetermined by the Kerr rotation angle $\Theta_k$ and the Kerr ellipticity angle $\epsilon_k$ for the phase difference δ of the wave plate and the angle γ between the wave plate optical axis and the polarization direction of the incident light.

Moreover, by setting the phase difference δ and the setting angle γ of the wave plate, the magneto-optical signal amount can be obtained which is equivalent to the signal amount obtainable by emitting linearly-polarized light and detecting only the Kerr effect. While this operation is under way, the feedback light quantity can be reduced and the laser noise due to the feedback light to the laser can be decreased. At the same time, the light quantity guided to the signal detecting systems such as the focusing error detecting system can be increased, so that the operation of the servo system, etc. can be stabilized.

What is claimed is:

1. A method of controlling an information processing apparatus comprising the steps of:

(a) passing a beam of light emitted by a light source through a diffracting optical element to produce a main beam and a couple of sub-beams, said diffracting optical element allows main beam to pass therethrough but diffracts said couple of sub-beams such that the respective sub-beams are given positive and negative astigmatisms, each of the astigmatisms having two focal lines;

(b) focusing said main beam, said sub-beam having positive astigmatism with the two focal lines, and said sub-beam having negative astigmatism with the two focal lines on an information recording medium, and receiving reflected beams thereof with photo-detecting elements, said main beam and said couple of sub-beams being focused at different positions in the optical direction;

(c) obtaining an off-track signal from the reflected rays from said main beam;

(d) obtaining a focusing error signal from the reflected rays of said couple of sub-beams; and (e) feeding said off-track signal and said focusing error signal back to a lens drive means.

2. A control method according to claim 1, further comprising the steps of detecting amplitude components of the reflected ray of said sub-beam having positive astigmatism with the two focal lines and the reflected ray of said sub-beam having negative astigmatism with the two focal lines received with the photo-detecting elements, and obtaining said focusing error signal from a difference between the two amplitude components.

3. A control method according to claim 2, wherein intermittently providing a plurality of marks for modulating reflected light quantities of the incident light beams in the track-advance direction of said information recording medium, said plurality of marks are aligned in the directions substantially perpendicular to said track-advance direction for a range of at least several tracks.

4. A control method according to claim 3, further comprising the steps of sampling and holding output levels of said photo-detecting elements when said sub-beams are located on said marks and when said sub-beams are located outside said marks, and taking differences of output levels of the two different output levels as said amplitude components.

5. A control method according to claim 4, wherein said diffracting optical element is a diffraction grating comprising a set of unequally-spaced interval straight grating grooves, the interval of which increases or decreases gradually.

6. A control method according to claim 5, wherein output signals of said main beam, modulated by first and second ones of said marks, are sampled and held, and an off-track signal is obtained from a difference of the two output signals.

7. A control method according to claim 4, wherein said diffracting optical element is a diffraction grating comprising a set of unequally-spaced interval concentric elliptical grating grooves, the interval of which increases or decreases gradually.

8. A control method according to claim 7, wherein the center position of said concentric elliptical grooves is decentered from an optical axis of said main beam.

9. A control method according to claim 8, wherein output signals of said main beam, modulated by said first and second marks, are sampled and held, and an off-track signal is obtained from a difference of the two output signals.

10. An optical information processing apparatus comprising:

(a) light source;

(b) diffracting means provided in an optical path of beams from said light source, said diffracting means allowing a part of said beams to pass therethrough as the main beam and producing a couple of sub-beams respectively having positive and negative astigmatisms with two focal lines, respectively in directions at very small angles different from the direction of the main beam;

(c) an image-forming optical system for focusing said main beam as a main light spot and also focusing said couple of sub-beams as light spots on the information recording surface, said information recording surface has marks for modulating the reflected light quantities of beams emitted thereon, said marks being provided in a large number in the track-advance direction and aligned in directions substantially perpendicular to said track-advance direction for a range of at least several tracks;

(d) separating optical system for separating out the beams reflected by said information from the optical path of said beams;

(e) photo-detecting means for receiving said reflected beams separated out by said separating optical system, said photo-detecting means comprising at least a first photo-detecting element for receiving a reflected ray of said main spot and a second photo-detecting element for receiving reflected rays of said couple of sub-beams;

(f) off-track detecting means for obtaining an off-track signal from output of said first photo-detecting element; and (g) a focusing error detecting means having amplitude detecting means for detecting the size of the amplitudes, modulated by said marks, of the respective reflected beams of said couple of sub-beams from output of said second photo-detecting element, said focusing error detecting means obtaining a focusing error detection signal from a difference of the amplitudes.

11. An apparatus according to claim 10, wherein said focusing error detecting means comprises a couple of amplitude detecting circuits for detecting the size of the amplitudes, modulated by said marks, of the respective reflected beams of said couple of sub-beams, and a first differential operation circuit for obtaining a difference of outputs of said couple of amplitude detecting circuits.

12. An apparatus according to claim 11, wherein each said amplitude detecting means comprises a first sample-and-hold circuit for holding the level of output of said photo-detecting element when said sub-beam is located on said mark, a second sample-and-hold circuit for holding the level of output of said photo-detecting element when said sub-beam is located outside said mark, and a second differential operation circuit for obtaining a difference of outputs of said first and second sample-and-hold circuits.

13. An apparatus according to claim 12, wherein each said amplitude detecting circuit has a switch circuit for keeping the polarity of the output of said second differential operation circuit always at a positive or a negative level.

14. An apparatus according to claim 13, wherein said marks comprise a plurality of first pits arranged a fixed distance shifted to one side from the center line of the track and a plurality of second pits arranged a fixed distance shifted to the opposite side from the center line of the track, and wherein said photo-detecting means comprises a photo-detecting element for receiving a reflected beam of said main beam, and an off-track detecting circuit for detecting the level of output of said photo-detecting element when said main beam passes said first pits and the level of output of said photo-detecting element when said main beam passes said second pits.

15. An apparatus according to claim 14, wherein said diffraction element is a diffraction grating comprising a set of unequally-spaced interval straight grating grooves, the interval of which decreases or increases gradually.

16. An apparatus according to claim 15, wherein output signals of said main beam, modulated by said first and second marks, are sampled and held, and from the two-output signals an off-track signal is obtained.

17. An apparatus according to claim 14, wherein said diffraction element is a diffraction grating comprising a set of unequally-spaced interval concentric elliptical grating grooves, the interval of which increases or decreases gradually.

18. An apparatus according to claim 17, wherein the center position of said concentric elliptical grooves is decentered from the optical path of said main beam.

19. An apparatus according to claim 15, wherein the output signals of said main beam, modulated by said first and second marks, are sampled and held, and from the two output signals an off-track signal is obtained.

20. An optical information processing apparatus comprising:
   (a) a diffraction grating for diffracting light beams emitted by a semiconductor laser into at least three beams, said three beams comprising a main beam and a couple of sub-beams, said diffraction grating giving said couple of sub-beams positive and negative astigmatism having two focal lines, respectively;
   (b) a focusing lens for focusing said main beam and said couple of sub-beams on the information recording surface;
   (c) a separating optical system, arranged between said information recording surface and said diffraction grating, for separating reflected beams from said information recording surface from the incident beams;
   (d) a lens for focusing said reflected beams on three photo-detecting elements, reflected beams of said main beams and said couple of sub-beams being focused respectively on said three photo-detecting elements;
   (e) a sampled servo circuit for detecting a tracking signal from a reflected beam of said main beam;
   (f) a focusing control means for detecting a focusing signal from the reflected beams of said couple of sub-beams, said focusing control means comprises envelope circuits for detecting amplitudes of signals respectively obtained from said couple of reflected beams, and a differential operation circuit for obtaining a difference of outputs of said two envelope circuits; and
   (g) an actuator for driving said focusing lens using output of said sampled servo circuit and output of said differential operation circuit.

21. An apparatus according to claim 20, wherein marks are provided on said information recording surface for modulating reflected light quantities of beams emitted thereon, said marks are being furnished in a large number in the track-advance direction, said large number of marks being aligned in directions substantially perpendicular to said track-advance direction for a range of at least several tracks.

22. An apparatus according to claim 20, wherein said optical information processing apparatus reproduces information magneto-optically, uses a wave plate for elliptically-polarizing an incident light from said light source, said wave plate being disposed between said focusing lens and said separating optical element, and emits elliptically-polarized light onto said information recording surface.

23. An apparatus according to claim 22, wherein a phase difference $\delta$ produced by said wave plate and a setting angle $\gamma$ between an optical axis of said wave plate and a plane of polarization of light incident on said wave plate are set at values predetermined by the Kerr rotation angle $\Theta_k$ and the Kerr ellipticity angle $\epsilon_k$ of said information recording medium.

24. An apparatus according to claim 23, wherein said phase difference $\delta$ and said setting angle $\gamma$ comply with the following condition:

$$\sin(\delta+\phi) \approx 1$$

where said wave plate is set in a manner to satisfy $$\tan\phi = \frac{2\Theta_k}{\sinh 2\epsilon_k \cdot \cos 2\gamma}.$$

25. An apparatus according to claim 24, wherein a light equality fed back to said light source is ½ or less the feedback light quantity when said wave plate is not used.

26. An apparatus according to claim 25, wherein said phase difference $\delta$ satisfies the following relation $$45° < (\delta - 2\pi m) < 90°$$

where m is 0 or a positive integer.

27. An apparatus according to claim 26, wherein said setting angle $\gamma$ satisfies the following relation $$22.5° < (\gamma - 2\pi m) < 45°$$

where m is 0 or a positive integer.

28. A method of controlling information processing apparatus comprising the steps of:
   (a) passing a beam of light emitted by a light source through a diffracting optical element having unequally-spaced interval concentric elliptical grating grooves disposed between the light source and a beam splitter to produce a main beam and a couple of sub-beams, said diffracting optical element allowing said main beam to pass therethrough but diffracting said couple of sub-beams;
   (b) focusing said main beam and said couple of sub-beams on an information recording medium, and receiving reflected beams thereof with photo-detecting elements disposed on a plane surface with respect to the information recording medium, said main beam and said couple of sub-beams being focused at different positions in the optical direction;
   (c) obtaining an off-track signal from reflected rays from said main beam;
   (d) obtaining a focusing error signal from reflected rays of said couple of sub-beams; and
   (e) feeding said off-track signal and said focusing error signal back to a lens drive means.

29. A method according to claim 28, wherein:
   step (a) includes passing said beam of light emitted by said light source through said diffracting optical element to produce said main beam and said couple of sub-beams and providing one sub-beam with positive astigmatism having two focal lines and another sub-beam with negative astigmatism having two focal lines; and step (b) includes focusing said main beam, said one sub-beam having positive astigmatism with the two focal lines, and said another sub-beam having negative astigmatism with the two focal lines on an information recording medium, and receiving reflected beams thereof with photo-detecting elements, said main beam and said couple of sub-beams being focused at different positions in the optical directions.

30. An optical information processing apparatus comprising:

(a) light source:

(b) diffracting means having unequally-spaced interval concentric elliptical grating grooves disposed between said light source and beam splitter, said diffracting means allowing the main beam to pass therethrough but diffracting a couple of sub-beams;

(c) an image-forming optical system for focusing said main beam as a main light spot and also focusing said couple of sub-beams as light spots on an information recording surface of an information recording medium, said information recording surface having marks for modulating the reflected light quantities of beams incident thereon, said marks being provided in a large number in the track-advance direction and aligned in directions substantially perpendicular to said track-advance direction for a range of at least several tracks;

(d) a separating optical system for separating out the beams reflected by said information from the optical path of said beams;

(e) photo-detecting means disposed on a plane surface with respect to the information recording medium, for receiving said reflected beams separated out by said separating optical system, said photo-detecting means comprising at least a first photo-detecting element for receiving a reflected ray of said main spot and a second photo-detecting element for receiving reflected rays of said couple of sub-beams;

(f) off-track detecting means for obtaining an off-track signal from output of said first photo-detecting element; and (g) focusing error detecting means having amplitude detecting means for detecting the size of the amplitudes, modulated by said marks, of the respective reflected beams of said couple of sub-beams from an output of said second photo-detecting element, said focusing error detecting means obtaining a focusing error detection signal from a difference of the amplitudes.

31. An apparatus according to claim 30, wherein said diffracting means passes the main beam therethrough and diffracts said couple of sub-beams such that the respective sub-beams are given positive and negative astigmatisms having two focal lines, respectively.

* * * * *